(12) United States Patent
Chokhani et al.

(10) Patent No.: US 11,892,501 B1
(45) Date of Patent: Feb. 6, 2024

(54) DIAGNOSING MULTICYCLE TRANSITION FAULTS AND/OR DEFECTS WITH AT-SPEED ATPG TEST PATTERNS

(71) Applicant: Cadence Design Systems, Inc., San Jose, CA (US)

(72) Inventors: Arvind Chokhani, Murphy, TX (US); Joseph M. Swenton, Owego, NY (US); Martin Amodeo, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 13 days.

(21) Appl. No.: 17/865,104

(22) Filed: Jul. 14, 2022

(51) Int. Cl.
G01R 31/28 (2006.01)

(52) U.S. Cl.
CPC ....... *G01R 31/287* (2013.01); *G01R 31/2879* (2013.01); *G01R 31/2882* (2013.01)

(58) Field of Classification Search
CPC G01R 1/0491; G01R 31/265; G01R 31/3012; G01R 31/318511
See application file for complete search history.

(56) References Cited

U.S. PATENT DOCUMENTS

| | | | |
|---|---|---|---|
| 7,779,381 B2 | 8/2010 | Chickermane | |
| 7,925,941 B2 * | 4/2011 | Bhatia | G01R 31/318547 714/729 |
| 8,875,077 B1 | 10/2014 | O'Riordan | |
| 10,528,692 B1 | 1/2020 | Guo | |
| 2010/0313091 A1 * | 12/2010 | Kodashiro | G06F 11/263 714/E11.02 |

OTHER PUBLICATIONS

Gao, et al., "Defect-Location Identification for Cell-Aware Test", 6 pages.
Ho, Shin-Yann et al., "Automatic Test Pattern Generation for Delay Defects Using Timed Characteristic Functions".
Mattiuzzo, et al., "Small-delay-defect TESTING:SDD automatic test-pattern generation breaks the nanometer quality barrier", Test & Measurement World, www.tmworld.com, Jun. 2009, pp. 37-41.

(Continued)

*Primary Examiner* — Tung X Nguyen
(74) *Attorney, Agent, or Firm* — Foley & Lardner LLP

(57) ABSTRACT

An integrated circuit (IC) test engine generates N-cycle at-speed test patterns for testing for candidate faults and/or defects of a first set of transition faults and/or defects of an IC design. A diagnostics engine that receives test result data characterizing application of the N-cycle at-speed test patterns to a fabricated IC chip based on the IC design by an ATE, in which the test result data includes a set of miscompare values characterizing a difference between an expected result and a result measured by the ATE for a given N-cycle at-speed test pattern. The diagnostics engine employs a fault simulator to fault-simulate the N-cycle at-speed test patterns against a fault model that includes a first set of transition faults and/or defects and fault-simulate a subset of the N-cycle at-speed test patterns against a fault model that includes multicycle transition faults and/or defects utilizing sim-shifting.

20 Claims, 9 Drawing Sheets

(56) References Cited

OTHER PUBLICATIONS

P.Sherubha, et al., "Test pattern generation for longest path eliminating SDD using ATPG", Proceedings of International Conference "ICSEM'13", International Journal of Engineering Research and Technology(IJERT), ICSEM-2013 Conference Proceedings, pp. 508-511.

Lin, et al., "Timing-Aware ATPG for High Quality At-speed Testing of Small Delay Defects", 8 pages.

F. Hapke, "Defect-Oriented Cell-Aware ATPG and Fault Simulation for Industrial Cell Libraries and Designs", International Test Conference, 2009 IEEE, pp. 1-10.

* cited by examiner

FIG. 3A

FIG. 3B

DIAGNOSING MULTICYCLE TRANSITION FAULTS AND/OR DEFECTS WITH AT-SPEED ATPG TEST PATTERNS

TECHNICAL FIELD

This disclosure relates to diagnosing faults and/or defects in integrated circuit (IC) chips. More particularly, this disclosure relates to utilizing at-speed test patterns to diagnose transition faults and/or defects detectable with multicycle test patterns that have at least two fault initialization cycles.

BACKGROUND

As IC chip complexity increases, meeting the testing requirements for acceptable quality assurance is becoming increasingly difficult. Automated testing involves applying test signals to each manufactured circuit in various patterns designed to detect faults and/or defects that cause improper circuit behavior. Although most modern integrated circuits comprise a number of interconnected cells selected from a library, early testing schemes assumed that faults occurred only between cell instances, at the cell I/O ports, or elsewhere outside cells altogether. The test patterns generated therefore did not necessarily include those needed to detect circuit faults inside a cell.

ATPG (acronym for both Automatic Test Pattern Generation and Automatic Test Pattern Generator) is an electronic design automation method/technology used to find an input (or test) sequence that, when applied to a digital circuit, enables automatic test equipment to distinguish between the correct circuit behavior and the faulty circuit behavior caused by defects. The generated patterns are used to test semiconductor devices after manufacture, or to assist with determining the cause of failure. The effectiveness of ATPG systems is measured by the number of modeled defects, or faults, detectable and by the number of generated patterns. These metrics generally indicate test quality (higher with more fault detections) and test application time (higher with more patterns). ATPG efficiency is another consideration that is influenced by the fault under consideration, the type of circuit under test (full scan, synchronous sequential, or asynchronous sequential), the level of abstraction used to represent the circuit under test (gate, register-transfer, switch), and the required test quality.

A defect is an error caused in a device during the manufacturing process which is a physical artifact (e.g., short or open). A fault is a mathematical description of how a defect alters design behavior. Faults representing various defects are aggregated into a fault model, usually sharing some common characteristic with respect to the kind of defects the faults represent. Furthermore, faults are modeled and simulated to generate patterns to detect defects. The logic values observed at the device's primary outputs, while applying a test pattern to some device under test (DUT), are called the output of that test pattern. The output of a test pattern, when testing a fault-free device that works exactly as designed, is called the expected output of that test pattern. A fault is said to be detected by a test pattern if the output of that test pattern, when testing a device that has only that one fault, is different than the expected output. The ATPG process for a targeted fault has two phases: fault activation and fault propagation. Fault activation establishes one or more signal values which, according to the fault description, are required to elicit the defective behavior from the IC chip. For example, a stuck-at-1 pin fault entails initializing the given pin with a value of 0, such that the result of the fault can be seen as a logical value difference in the circuit. Fault propagation moves the resulting signal value, or fault effect, forward by sensitizing a path from the fault site to a primary output and/or an observable scan flop. For example, a path is "sensitized" by ensuring that logic values of 0 and 1 can proceed, unimpeded through the path, usually by setting additional circuit values such that potential logic gates along the way are set to non-controlling values.

A standard cell is a group of transistor and interconnect structures that provides a Boolean logic function (e.g., AND, OR, NOR, NAND, XOR, XNOR, inverters) or a storage function (flipflop or latch). The simplest cells are direct representations of the elemental NAND, NOR and XOR Boolean functions, although cells of much greater complexity are commonly used (such as a 2-bit full-adder, or muxed D-input flipflop). The cell's Boolean logic function is called its logical view: functional behavior is captured in the form of a truth table or Boolean algebra equation (for combinational logic), or a state transition table (for sequential logic).

Scan chains are the elements in scan-based designs of IC chips that are used to shift-in and shift-out test data. The test data includes both input stimulus applied to an IC chip under test as well as associated output responses. A scan chain is formed by a number of scan flops connected back to back in a chain with the output of one scan flop connected to another. An input of a first scan flop is connected to a channel input. The channel input can be driven by a pin of the IC chip (referred to as a scan-in pin) from which scan data is fed or by a scan decompressor output. In such a situation, an input of the scan decompressor can be connected to a scan-in pin of the IC chip. Scan-in inputs of the IC chip can be directly controlled by automatic test equipment (ATE). The output of a last scan flop is connected to an output pin of the chip (referred to as a scan-out pin) or to the input pin of a scan compressor, which in turn can drive the scan-out pin of the IC chip. The scan-out pin is used to observe and/or measure shifted data out and is provided to an output pin of the IC chip. Output pins of the IC chip can be directly observed with the ATE.

A scan flop or scan flip-flop (SFF) in a scan chain can be a muxed input master-slave based D flip-flop that allows its input to come from a data port (D) or from an alternative source, namely, as scan-input (SI) port. A scan enable signal (SE) controls the scan flop. More particularly, if the scan enable signal is asserted (e.g., logical 1), the scan flop passes data received at the scan-input (SI) port to an output port (Q) of the scan flop. Conversely, if the scan enable signal is de-asserted (e.g., logical 0), the scan flop passes data received at the data port (D) to the output port. In this manner, the scan flop is employable in a scan chain to test an IC chip, and is employable for functional operation of the IC chip.

SUMMARY

One example relates to a non-transitory machine-readable medium having machine-readable instructions. The machine-readable instructions include an IC test engine that generates N-cycle at-speed test patterns for testing for candidate faults and/or defects of a first set of transition faults and/or defects of an IC design, where N is an integer greater than or equal to two. The machine readable instructions also include a diagnostics engine that receives test result data characterizing application of the N-cycle at-speed test patterns to a fabricated IC chip based on the IC design by an ATE, in which the test result data includes a set of miscompare values characterizing a difference between an expected result and a result measured by the ATE for a given N-cycle at-speed test pattern of the N-cycle at-speed test patterns. The diagnostics engine employs a fault simulator to fault-simulate the N-cycle at-speed test patterns against a fault model that includes a first set of transition faults and/or defects and fault-simulate a subset of the N-cycle at-speed test patterns against a fault model that includes multicycle transition faults and/or defects utilizing sim-shifting to diagnose a second set of transition faults and/or defects in the fabricated IC chip that are only detectable with test patterns that have one or more additional initialization cycles than a corresponding one of the N-cycle at-speed test patterns. The diagnostics engine scores candidate fault and/or defects in the first set of transition faults and/or defects and the second set of transition faults and/or defects for applicable test patterns of the N-cycle at-speed test patterns to determine a most likely fault and/or defect present in the fabricated IC chip.

Another example relates to a system that includes an ATE that applies N-cycle at-speed test patterns to a fabricated integrated circuit (IC) chip that is based on an IC design and provides test result data characterizing application of the N-cycle at-speed test patterns to the fabricated IC chip, where N is an integer greater than or equal to two, in which the test result data includes a set of miscompare values characterizing a difference between an expected result and a result measured by the ATE for a given N-cycle at-speed test pattern of the N-cycle at-speed test patterns. The system also includes a non-transitory memory that stores machine-readable instructions and a processing unit that accesses the memory and executes the machine-readable instructions. The machine-readable instructions include an IC test engine that generates the N-cycle at-speed test patterns for testing for candidate faults and/or defects of a first set of transition faults and/or defects of the IC design. A diagnostics engine employs a fault simulator to fault-simulate a subset of the N-cycle at-speed test patterns against a fault model that includes transition faults and/or defects utilizing sim-shifting to diagnose a second set of transition faults and/or defects in the fabricated IC chip that are only detectable with a multicycle test pattern having one or more additional initialization cycles than a corresponding one of the N-cycle at-speed test patterns. The diagnostics engine scores candidate faults and/or defects in the first set of transition faults and/or defects and the second set of transition faults and/or defects for applicable test patterns of the subset of the N-cycle at-speed test patterns to determine a most likely fault and/or defect present in the fabricated IC chip.

Yet another example relates to a method for diagnosing faults and/or defects in a fabricated IC chip. The method includes generating, by an IC test engine operating on a computing platform, N-cycle at-speed test patterns for testing for candidate faults and/or defects of a first set of transition faults and/or defects of an IC design, where N is an integer greater than or equal to two. The method also includes applying, by an ATE, the N-cycle at-speed test patterns to a fabricated IC chip that is based on the IC design and provides test result data characterizing application of the N-cycle at-speed test patterns to the fabricated IC chip, in which the test result data includes a set of miscompare values characterizing a difference between an expected result and a result measured by the ATE for a given N-cycle at-speed test pattern of the N-cycle at-speed test patterns. The method further includes selectively fault-simulating, by a fault simulator of a diagnostics engine operating on the computing platform, a subset of the N-cycle at-speed test patterns against a fault model that includes transition faults and/or defects utilizing sim-shifting to diagnose a second set of transition faults and/or defects in the fabricated IC chip that are only detectable with multicycle test patterns having one or more additional initialization cycles than a corresponding one of the N-cycle at-speed test patterns. The method includes scoring, by the diagnostics engine, candidate faults and/or defects in the first set of transition faults and/or defects and the second set of transition faults and/or defects for applicable test patterns of the subset of the N-cycle at-speed test patterns to determine a most likely fault and/or defect present in the fabricated IC chip.

BRIEF DESCRIPTION OF THE DRAWINGS

FIG. 3A illustrates an example of a defect detection matrix (DDM) for a cell with two-cycle test patterns.

FIG. 3B illustrates another example of a DDM for a cell with three-cycle test patterns.

DETAILED DESCRIPTION

Figure 1:
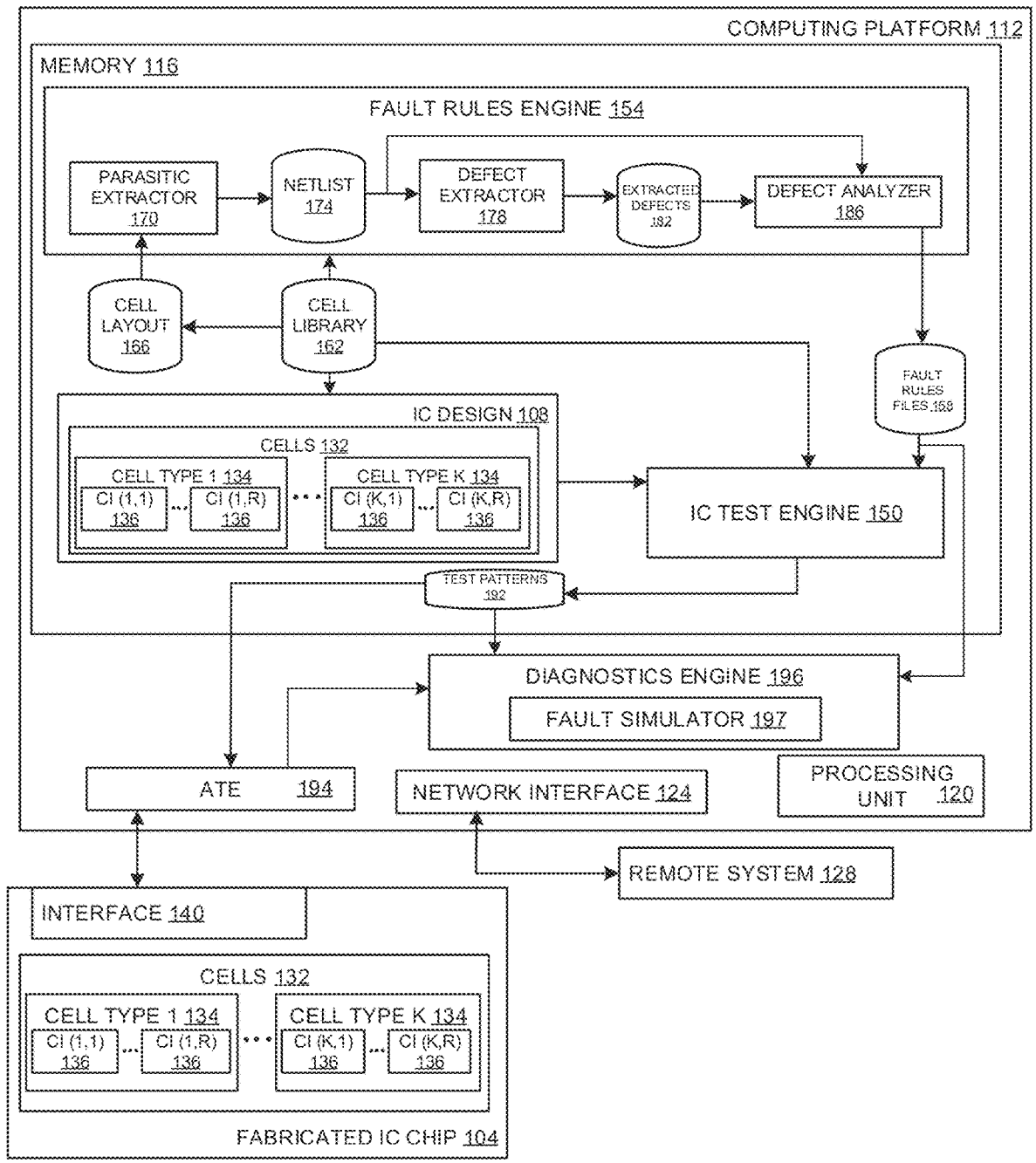
FIG. 1 illustrates an example of a system for diagnosing faults and/or defects in a fabricated IC chip that is based on an IC design.

This disclosure relates to a system for diagnosing faults and/or defects of a fabricated IC chip that are based on an IC design. More particularly, this disclosure relates to employing sim-shifting of test patterns to improve accuracy in diagnosing other faults and/or defects. The system includes an IC test engine that generates N-cycle at-speed test patterns for testing for candidate faults and/or defects of a first set of transition faults and/or defects of an IC design, where N is an integer greater than or equal to two. Accordingly, each N-cycle at-speed test pattern is a multicycle test pattern with a single fault initialization cycle in a scan-in shift window. The system also includes an ATE that applies the plurality of N-cycle at-speed test patterns to a fabricated IC chip that is based on the IC design and provides test result data characterizing application of the N-cycle at-speed test patterns to the fabricated IC chip. If failures are detected by the ATE during application of the N-cycle at-speed test patterns, the N-cycle at-speed test patterns and the test result data are provided to a diagnostics engine to find the fault(s)/defect(s) which best explains the cause of failures in the fabricated IC chip on the ATE. The test result data includes a miscompare value (or multiple miscompare values) characterizing a difference between an expected result and a result measured by the ATE for a corresponding N-cycle at-speed test pattern of the plurality of N-cycle at-speed test patterns. More specifically, a "miscompare value" refers to a value recorded in the test result data that identifies differences, or "miscompares", between expected values at observable scan flops and primary outputs (as determined by an ATPG engine and a diagnostics engine), and the values measured from the IC chip on the ATE.

To execute the diagnostics, the diagnostics engine employs a fault simulator to fault-simulate a subset of the N-cycle at-speed cycle test patterns against possible faults and/or defects potentially detected by the subset of N-cycle at-speed test patterns. This includes fault-simulating the subset of at speed test patterns against a fault model with multicycle transition faults/defects. The diagnostics engine utilizes sim-shift techniques to diagnose a set of transition faults and/or defects in the fabricated IC chip that are conventionally detectable only with at speed test patterns that have one or more additional initialization cycles than a corresponding one of the N-cycle at-speed test patterns. The diagnostics engine scores the candidate faults/defects applicable to the subset of the N-cycle at-speed test patterns to determine the most likely fault/defect (or multiple faults/defects) present in the fabricated IC chip.

More generally, an at-speed test pattern is a test pattern that has two or more clock pulses at functional speed during a capture window where a scan/shift enable is typically de-asserted. In a case with two at-speed cycles in the capture window of a multicycle test pattern, the second clock cycle is defined as a capture cycle and the first cycle is defined as a launch cycle (or release cycle). There are other examples where cycles other than the cycle N−1 and the cycle N in the capture window are the launch and capture cycles respectively. In such cases, the cycles prior to launch cycles in the capture window are the fault/defect initialization cycles and cycles after the capture cycle in the capture window are fault/defect propagation cycles. The launch cycle creates the transition (fault excitation) at the fault site required to detect a fault and/or defect while the capture cycle observes the transition on a primary output, a non-scan flop or an observable scan flop. The last scan load shift cycle in the shift window sets the initial values (fault initialization) which enables the creation of the transition during the launch cycle. Additionally, the last clock cycle during the capture window (capture cycle) allows observing the fault effect on a primary output or observable scan flop(s).

Additionally, a two-cycle at-speed test pattern refers to a particular type of test pattern that has exactly two clock pulses at the functional speed during the capture window, and one fault initialization cycle in the scan shift window before the capture window. More generally, an at-speed test pattern is a test pattern that has two or more clock pulses at functional speed during a capture window where a scan/shift enable is typically de-asserted. In a case with two at-speed cycles in the capture window of a multicycle test pattern, the second clock cycle is defined as a capture cycle and the first cycle is defined as a launch cycle (or release cycle). There are other examples where cycles other than the cycle N−1 and the cycle N in the capture window are the launch and capture cycles respectively. In such cases, the cycles prior to launch cycles in the capture window are the fault/defect initialization cycles and cycles after the capture cycle in the capture window are fault/defect propagation cycles. The launch cycle creates the transition (fault excitation) at the fault site required to detect a fault and/or defect while the capture cycle observes the transition on a primary output, a non-scan flop or an observable scan flop. The last scan load shift cycle in the shift window sets the initial values (fault initialization) which enables the creation of the transition during the launch cycle. Additionally, the last clock cycle during the capture window (capture cycle) allows observing the fault effect on a primary output or observable scan flop(s). Unless otherwise noted, throughout this disclosure, an N-cycle at-speed test pattern refers to an at-speed test pattern (e.g., alternatively referred to as a multicycle at speed test pattern) with N number of clock pulses operating at functional speed during the capture window and one fault initialization cycle in a scan shift window, where N continues to be an integer greater than or equal to two.

An N-cycle (N is two or more) at-speed test pattern can detect transition faults/defects (alternatively referred to as delay faults/defects) and has N clock cycles at functional speed during the capture window where the scan enable signal is typically de-asserted. Sim-shifting the N-cycle at-speed test pattern entails fault-simulating two or more scan shift cycles prior to the capture window of the N-cycle at-speed test pattern as fault initialization cycles and employing some of the initial N-cycles in the capture window as extra fault initialization cycles (if any), as well as fault launch and capture cycles to detect a fault/defect which otherwise requires more than N number of cycles during the capture window (e.g., such as an N+P cycle at-speed test pattern, including simulating a delay defect requiring 3 initialization cycles during a 2-clock delay test pattern). If the fault launch cycle creates the transition required to detect the fault/defect and the final state of the transition can be observed during the capture pulse, then sim-shifting results in that fault/defect detection. In this manner, the N-cycle at-speed test pattern (with only one fault initialization cycle in the scan shift window) mimics the operation of an at-speed test pattern with more than N number of cycles in the capture window. Stated differently, simshifting the N-cycle at-speed test pattern enables the N-cycle at-speed test pattern to detect some transition faults/defects that would otherwise require an N+P cycle at-speed test pattern, where P is an integer greater than or equal to one. In some examples of this context, P would be equal to the number of sim-shifted scan load cycles.

Accordingly, the N-cycle at-speed test pattern is employable to detect a multicycle transition fault/defect (e.g., a transition cell-aware defect) with two or more fault initialization cycles, which can be referred to as extra fault initialization cycles (e.g., mimicking operation of an N+P cycle at-speed test pattern), such that the same N-cycle at-speed test pattern is employable to detect different multicycle transition fault(s)/defect(s). Stated differently, sim-shifting of the N-cycle at-speed test pattern during diagnostics enables such N-cycle at-speed test patterns to be utilized to diagnose multicycle transition faults/defects (such as multicycle cell-aware defects) that conventionally are only diagnosable with a multicycle test pattern that has one or more additional initialization cycles than the N-cycle at-speed test pattern (e.g., an N+P cycle at-speed test pattern). More particularly, the systems and methods described herein enable the fault simulator of the diagnostics engine to recognize that N-cycle at-speed test patterns are employable to a plurality of multicycle transition faults/defects, including multicycle transition faults/defects that require multiple fault initialization cycles, and to assign appropriate credit to the N-cycle at-speed test patterns, which obviates the need to explicitly target certain multicycle fault defects and generate unnecessary multicycle tests.

Additionally, the diagnostics engine scores the candidate defects applicable to the subset of the test patterns to determine the most likely fault/defect present in the fabricated IC chip. To score candidate faults/defects, the diagnostics engine employs a fault simulator to fault-simulate the N-cycle at-speed test patterns against the fault models with applicable faults/defects including both multicycle transition faults/defects with one fault initialization cycle in the scan shift window and multicycle transition faults/defects with extra fault initialization cycles (two or more fault initialization cycles) in the scan shift window to increase an accuracy in determining that a subset of miscompare value(s) of the N-cycle at-speed test pattern result data from ATE are caused by a given fault/defect. The diagnostics engine scores the candidate fault/defect with the greater probability higher. A fault/defect with a highest score is the most likely present fault/defect in the fabricated IC chip. In this manner, multicycle defects present in the fabricated IC chip that are conventionally only diagnosable with N+P number of at-speed cycles in the capture window are diagnosed with the sim-shifting of N-cycle at-speed ATPG test patterns. A fault/defect with a higher score is more likely to explain the miscompare value(s) recorded in the result data, and thus, more likely to exist in the fabricated IC chip.

FIG. 1 illustrates an example of a system 100 for diagnosing faults and/or defects in a fabricated IC chip 104 that is based on an IC design 108. The system 100 can include a computing platform 112. Accordingly, the computing platform 112 can include a memory 116 for storing machined readable instructions and data and a processing unit 120 for accessing the memory 116 and executing the machine-readable instructions. The memory 116 represents a non-transitory machine-readable memory (or other medium), such as random access memory (RAM), a solid state drive, a hard disk drive or a combination thereof. The processing unit 120 can be implemented as one or more processor cores. The computing platform 112 can include a network interface 124 (e.g., a network interface card) configured to communicate with other computing platforms via a network, such as a public network (e.g., the Internet), a private network (e.g., a local area network (LAN)) or a combination thereof (e.g., a virtual private network).

The computing platform 112 could be implemented in a computing cloud. In such a situation, features of the computing platform 112, such as the processing unit 120, the network interface 124, and the memory 116 could be representative of a single instance of hardware or multiple instances of hardware with applications executing across the multiple of instances (e.g., distributed) of hardware (e.g., computers, routers, memory, processors, or a combination thereof). Alternatively, the computing platform 112 could be implemented on a single dedicated server or workstation.

The IC design 108 can be stored in the memory 116 of the computing platform 112. The IC design 108 can be implemented, for example, as design specifications for an IC chip. The IC design 108 can be generated with an electronic design automation (EDA) application operating on a remote system 128, such as a logic synthesis application (e.g., a synthesis tool). For instance, an end-user of the EDA application can employ a user-interface to generate and/or modify hardware description language (HDL) code (e.g., Verilog) for generating a register-transfer level (RTL) model (e.g., RTL code) characterizing a circuit, wherein the RTL model is transformable by an EDA application into a physically realizable gate-level netlist for the IC design 108.

As noted, in the examples described, the fabricated IC chip 104 represents a physically instantiated version of the IC design 108. More particularly, the fabricated IC chip 104 and the IC design 108 can include intellectual property (IP) blocks formed of cells 132. Each of the cells 132 (alternatively referred to as standard cells), can represent a group of transistor and interconnect structures that provides a Boolean logic function (e.g., AND, OR, NOR, NAND, XOR, XNOR, inverters) or a storage function (e.g., flipflop or latch) or some combination thereof. The cells 132 of the fabricated IC chip 104 represent physically instantiated versions of the cells 132 of the IC design 108. Thus, the cells 132 of the IC design 108 and the cells 132 of the fabricated IC chip 104 employ the same reference numbers. In many instances, there can be virtually any number of cells 132 (e.g., hundreds, thousands or millions).

In the present example, there are K number of different cell types 134 of the cells 132, where K is an integer greater than or equal to one. Additionally, there are R number of cell instances 136 for each of the K number of cell types 134, where R is an integer greater than or equal to one. Each cell instance 136 represents a specific instantiation in the IC design 108 for a corresponding cell type 134. Moreover, there can be a different (or the same) number of cell instances 136 for each of the K number of cell types 134.

For purposes of simplification of explanation, each of the cell instances 136 includes a unique identifier implemented as a two-dimensional index number, i,j, where i identifies the cell type 134 and j identifies the cell instance number for the cell type 134. For instance, the cell instance 136 labeled as CI (1,R) uniquely identifies the Rth cell instance of cell type 1. Similarly, the cell instance 136 labeled as CI (K,1) uniquely identifies the first cell instance 136 of the Kth cell type 134.

The fabricated IC chip 104 can include an interface 140 that enables external systems to provide stimuli to the components of the fabricated IC chip 104, including the cells 132 of the fabricated IC chip 104. The interface 140 can conform to the standards set forth in the IEEE 1149.1 standards and/or the IEEE 1149.6 standards, and can be implemented with PCI, wafer probes, etc.

The memory 116 includes an IC test engine 150 which can be implemented as application software or a software module. The IC test engine 150 is configured to generate and execute employ ATPG techniques to generate boundary model and cell-aware test patterns that can be applied to the fabricated IC chip 104 to ensure proper operation.

The IC test engine 150 can operate in concert with a fault rules engine 154 stored in the memory 116. The fault rules engine 154 can be configured/programmed to generate fault rules files 158. In some examples, the fault rules engine 154 generates Defect Detection Matrices (DDMs) that each represents a user-readable format of a corresponding fault rules file 158. Each fault rules file 158 represents a set of fault rules for a particular cell type 134 of the K number of cell types 134 that is selected from a cell library 162. The cell library 162 can include, but is not limited to, data characterizing a physical layout of each of the K number of cell types 134 in the cells 132 of the IC design 108 and the fabricated IC chip 104. The cell library 162 can also include structural Verilog (.v), behavioral Verilog (.v) and timing models (.lib).

To generate the fault rules files 158, the fault rules engine 154 can read a cell layout 166 from the cell library 162. The cell layout 166 corresponds to a physical layout view of the standard cell type 134 in terms of mask polygons containing the geometrical data required to instantiate the fabricated IC chip 104. The fault rules engine 154 generates a particular fault rules file 158 of the fault rules files 158 based on the cell identified in the cell layout 166.

The fault rules engine 154 can represent a plurality of software applications that operate in an ordered sequence to generate each instance of the fault rules file 158. In particular, the cell layout 166 can be received by a parasitic extractor 170. The parasitic extractor 170 generates a transistor-level netlist 174 of the cell represented by the cell layout 166. The parasitic extractor 170 utilizes the cell layout 166, along with other fabrication technology-related information available in the cell library 162 to generate the transistor level netlist 174. The netlist 174 is a textual description of the standard cell type 134 in terms of its designed devices (e.g., transistors), input output pins and their inter-connections. The netlist 174 also includes unavoidable parasitic resistors (Rs) and capacitors (Cs) inherent to a standard cell type 134 extracted by the parasitic extractor 170. The parasitic resistors, for example, can be extracted on the wires and inter-connects and for the terminals of a transistor e.g. drain, gate, source, bulk. The parasitic extractor 170 can extract parasitic capacitors between wires on the same layer (intra-layer), between layers (inter-layer) or across transistor terminals e.g. drain-gate, drain-source, bulk-drain, etc. The netlist 174 can be provided in the Detailed Standard Parasitic Format (DSPF).

The fault rules engine 154 can include a defect extractor 178 that can analyze the netlist 174 to identify parasitic resistors and capacitors to be modeled as potential open and short defects for the standard cell type 134 to provide extracted defects 182. The extracted defects 182 can include data for modeling each of the defects identified in the netlist 174. For instance, a large parasitic resistor indicates a long and thin wire segment that can undergo an unintended break, and hence is a potential 'open' defect site. A large parasitic capacitance between two nets or wire segments indicates that the two nets or wires are relatively close to one another and along a relatively long distance, hence can be potentially shorted. An open defect is modeled with a high ohmic resistance (e.g. 1 G Ohm), and a short is modeled with a very low resistance (e.g., 0.001 Ohm).

The extracted defects 182 from the netlist 174 can be provided to a defect analyzer 186 that characterizes each of the extracted defects 182 in the netlist 174. More particularly, the defect analyzer 186 simulates operation of a circuit representing the cell layout 166 for each instance of the extracted defects 182. For example, the defect analyzer 186 can simulate operation of the circuit representing a particular cell with each parasitic capacitor and/or resistor being set to a fault/defect free value, and open or a short. The defect analyzer 186 can identify transition faults/defects as well as static faults/defects in one of the K number of cell types 134 characterized by the cell layout 166. Transition faults/defects characterize faults/defects wherein a component within the cell reaches an expected value slower than is acceptable. In some examples, transition faults/defects are referred to as delay faults/defects or dynamic faults/defects. Conversely, static faults/defects refer to faults/defects that cause a circuit component to not reach an expected value within the typically used tester cycle period (e.g. 20 ns for a 50 MHz tester cycle). Throughout this disclosure, unless otherwise noted the faults/defects analyzed by the defect analyzer 186 refer to transition faults/defects. The defect analyzer 186 outputs an instance of the fault rules file 158 based on the results of the analysis. The fault rules engine 154 can repeat operations to iteratively generate the fault rules files 158 for each cell type 134 in the K number of cell types 134.

To facilitate understanding of the operations of the fault rules engine 154, a given extended example ("the given example") is provided and explained with respect to FIGS. 2, 3A, 3B, 4 and 5. The given example illustrates and describes how a fault rules file can be generated for an AND gate cell.

Figure 2:
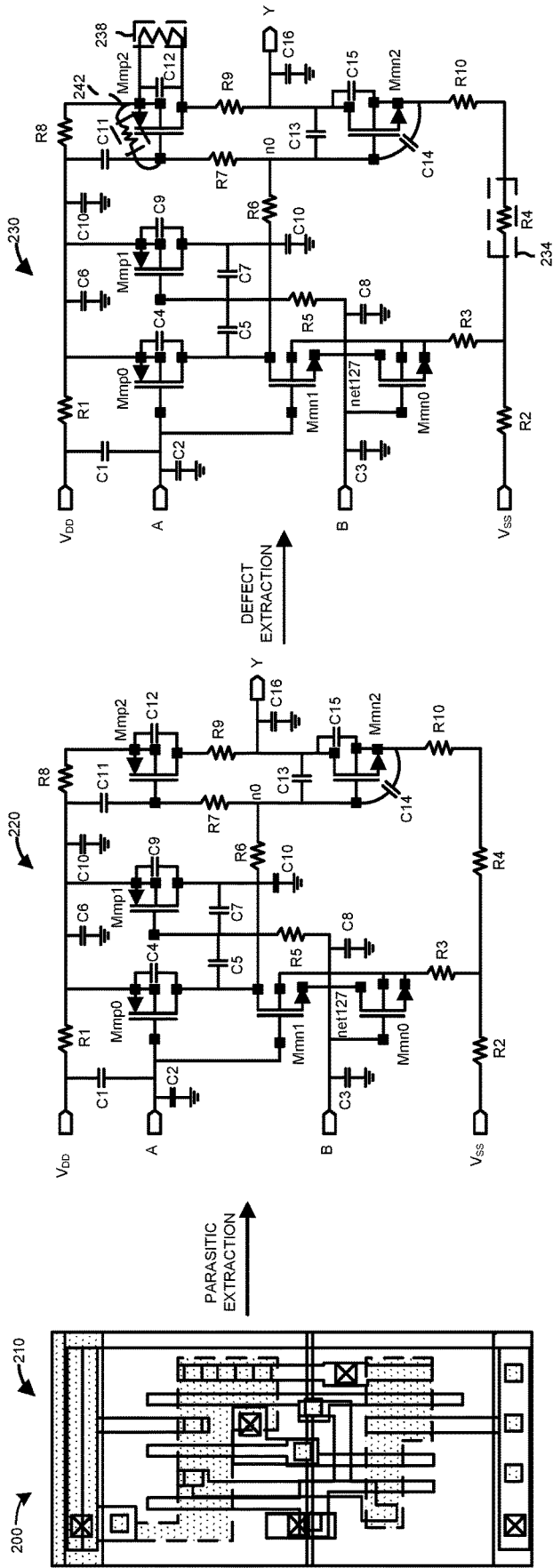
FIG. 2 illustrates diagrams depicting a flow for extracting potential faults and/or defects in a cell.

FIG. 2 includes diagrams depicting a flow 200 for extracting potential faults/defects in a cell in the given example. FIG. 2 includes a physical cell layout 210 for an AND gate. The physical cell layout 210 characterizes the physical layout of an IC chip that physically instantiates the AND gate. More particularly, the physical cell layout 210 includes connection points and traces that form the AND gate.

A parasitic extractor, such as the parasitic extractor 170 of FIG. 1 can analyze the physical cell layout 210 to generate a transistor-level netlist of the physical cell layout 210. The transistor-level netlist provides data sufficient to generate a circuit diagram 220 for the physical cell layout 210. The parasitic extractor analyzes the netlist to identify and extract parasitic components in the cell represented by the circuit diagram 220. These parasitic resistors and capacitors are not intended by the designer of the cell, but exist in a fabricated IC chip that employs the cell. Parasitic capacitance, or stray capacitance is an unavoidable (and usually unwanted) capacitance that exists because of a proximity of circuit components, such as wires, interconnects between transistor terminals, etc. Similarly, all conductors (e.g. wires, interconnects) in the physical cell layout 210 possess some unavoidable parasitic resistance. The parasitic extractor extracts (or models) these parasitic resistors and capacitors in the circuit diagram 220. In this manner, the parasitic extractor generates an accurate analog model for the physical cell layout 210 that is characterized in the circuit diagram 220, which analog model is employable to emulate circuit responses in detailed simulations of the circuit diagram 220.

The parasitic extractor identifies (marks) node in the netlist with the parasitic components that coincide with possible fault/defect sites. Thus, the parasitic extractor augments the netlist with data that includes the identification of parasitics extracted from the netlist. In the given example, the parasitic extractor analyzes the circuit diagram 220 to provide a circuit diagram 230 that includes specific identification of a resistor R4 234 in the netlist as a parasitic component.

The netlist that is in DSPF identifies parasitics can be provided to a defect extractor, such as the defect extractor 178 of FIG. 1. The defect extractor employs the parasitics identified in the netlist to model potential open and short defects within a standard cell. More particularly, the defect extractor can analyze the identified parasitics and generate a fault for each identified parasitic in the netlist, or some subset thereof. Additionally, the defect extractor searches the circuit diagram 220 to identify nets that are relatively long which could form a parasitic resistor and/or nets that are relatively close and running parallel over long distance, which could form a parasitic capacitor. These parasitic capacitors have a high probability of corresponding to probable short and open locations as a result of defects induced during fabrication. That is, the defect extractor can identify locations in the netlist that have a higher probability of corresponding to manufacturing defects.

The fault for each parasitic resistor can represent an instance of a circuit design wherein a respective parasitic resistor is modeled as an open (e.g. a resistor with a resistance of 1 G Ohm). Examples of such modeled opens can include, but are not limited to opens at a drain, gate, source and bulk terminals on FETs, and opens on each branch of interconnected nets including signaling nets and between power-ground nets. Additionally, the fault for each parasitic capacitor can be represented as an instance of the circuit design wherein a respective parasitic capacitor is modeled as a short (e.g., a resistor with a resistance of 0.001 Ohms). The examples of such modeled shorts can include, but are not limited to shorts across FET terminal pairs, including drain-source, drain-gate, source-gate, bulk-drain, bulk-gate and bulk-source pairs. The examples of such model shorts also include shorts across each possible interconnected net pairs, signal nets on the same layer (e.g., intralayer shorts), shorts between power-ground nets (e.g., power-ground shorts) and shorts between adjacent layers (e.g., inter-layer shorts). The defect extractor can provide extracted faults/defects, such as the extracted defects 182 of FIG. 1 that identifies the location of faults/defects modeled by the defect extractor. In the given example, the resistor R4 234 can be modeled as an open circuit in one fault of the circuit design. In another fault of the circuit design, the capacitor C12 238 or the transistor terminals of MMP2 242 can be modeled as a short. That is, the defect extractor generates multiple versions of a circuit representing a cell, wherein each version (a fault) includes an open or a short replacing a particular parasitic resistor or parasitic capacitor. Each of the faults can be aggregated into the extracted faults/defects that can be provided to a defect analyzer, such as the defect analyzer 186 of FIG. 1.

The defect analyzer can employ the extracted faults/defects characterized with faults to generate a DDM and a fault rules file that characterizes a detectability of each fault identified in the netlist, or some subset thereof. More particularly, the defect analyzer can employ fault analysis to generate the DDM and the fault rules file for the cell. In the given example, it is presumed that there are 41 potential faults. The defect analyzer applies a set of multicycle test patterns for each potential fault to determine whether a fault/defect is detectable, and if the fault is detectable, to determine if the fault/defect is a transition fault/defect. Moreover, if the fault is a transition fault/defect, the defect analyzer can determine if the fault/defect is detectable with an N-cycle at-speed test pattern with a single scan in cycle or if a multicycle test pattern with multiple scan cycles is needed.

In the given example, the circuit diagram 220 includes input nodes labeled A and B and an output node labeled Y. As noted, in the given example, the cell represents an AND gate. Thus, an instance of the cell with no faults/defects should provide an output of a logical one on node Y if, and only if nodes A and B have a logical one applied there-on. Additionally, node Y should output a logical 0 for all other combinations of logical values applied to nodes A and B. To generate the DDM and the fault rules file, the defect analyzer simulates instantiations of the cell that have particular faults/defects and analyzes whether a particular fault/defect impacts an output of a cell based on the application of two-cycle at-speed test patterns and three-cycle at-speed test patterns applied to the input nodes (nodes A and B in the given example). The defect analyzer can be configured to apply multiple two-cycle and three cycle at-speed test patterns for each candidate fault/defect identified in the netlist. The results can be aggregated to form a DDM and a fault rules file for the cell.

Figure 3A:
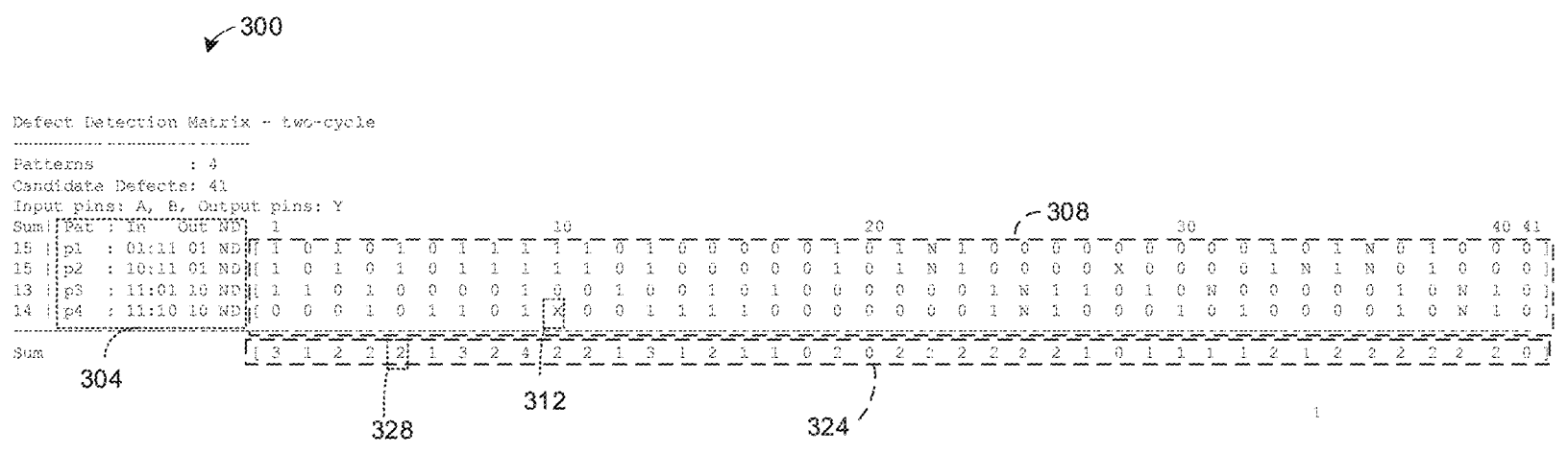

FIG. 3A illustrates an example of a DDM 300 that could represent the cell (an AND gate) in the given example that includes two-cycle at-speed test patterns (e.g., multicycle test patterns where N=2). In the DDM 300, a first box 304 identifies and characterizes four two-cycle at-speed test patterns, labeled p1 . . . p4. For instance, in the given example, the two-cycle at-speed test pattern p1 is labeled as (In) 01:11, (Out) 01 and (ND) "ND". This labeling indicates that in a first test pattern, a logical 0 is applied to node A, and a logical 1 is applied to node B, and that an expected response at the output node, Y is a logical 0. Additionally, this labeling also indicates that in a second test pattern, a logical 1 is applied to node A and to node B, and that the expected response at the output node, Y is a logical 1. Furthermore, the labeling "ND" of p1 represents a recorded nominal delay, Delaynom for the test pattern, p1 (e.g., the transition delay for a defect-free version of the cell). Values at "ND" are stored as integer or fixed point/floating point values.

Additionally, the DDM 300 includes a 41 by 4 results matrix 308 wherein each of the 41 columns represents a recorded result of a corresponding two-cycle at-speed test pattern for a particular candidate fault/defect. That is, each column represents a response to four two-cycle at-speed test patterns, p1 . . . p4 by a particular version of the cell where one fault/defect is modeled. Values in the results matrix 308 of the DDM 300 recorded as a 0 indicate that the particular fault/defect did not have a detectable change on the operation of a cell for a corresponding test pattern. For instance, the value stored in the results matrix 308 at column 3, row 3 indicates that the two-cycle at-speed test pattern p3 (11:01; 10; "ND") in the first box 304 has a value of 0. This indicates that the two-cycle at-speed test pattern, p3 is not employable to detect the particular candidate fault/defect modeled in column 3. Additionally, values in the results matrix 308 of the DDM 300 recorded as an N indicate that the particular fault/defect is a transition cell-aware fault/defect requiring 2 cycles to be detected by the corresponding test pattern. A recorded value of 'N' represents a percent deviation or a time deviation (e.g., in µs, ns or ps) from a corresponding nominal delay 'ND' caused by applying a corresponding test pattern for a particular candidate fault/defect. For instance, the value stored at column 22, row 1 indicates that the two-cycle at-speed test pattern p4 (11:10; 10; "ND") has a value of N. This indicates that the two-cycle at-speed test pattern (e.g., an at speed multicycle test pattern where N=2), p4 is employable to detect a two-cycle transition/delay cell-aware fault/defect for the particular candidate fault/defect model in column 4.

Further, values in the results matrix 308 of the DDM 300 recorded as a 1 indicate that the particular fault/defect is a static fault/defect requiring 2 cycles to be detected by the corresponding test pattern. For instance, the value stored at column 4, row 4 indicates that the two-cycle at-speed test pattern p4 (11:10; 10; "ND") has a value of 1. This indicates that the two-cycle at-speed test pattern (e.g., a multicycle test pattern where N=2), p4 is employable to detect a two-cycle static fault/defect for the particular candidate fault/defect model in column 4.

A recorded value of 'X' in the results matrix 308 indicates that the corresponding test pattern is not employable to detect a fault/defect caused by the candidate fault/defect of the corresponding column due to non-convergence, where the solution from fault analysis was indeterminant. Furthermore, in the given example, the value at column 10, row 4 in a second box labeled 312 is set to 'X', indicating that due to non-convergence, the two-cycle at-speed test pattern p4 is not employable to detect a fault/defect caused by the particular candidate fault/defect modeled in column 10.

The DDM 300 also includes a one row sum matrix 324 that stores integer values characterizing a number of test patterns p1 . . . p4 that are employable to detect a particular transition fault/defect. For instance, in a box 328, a value of 2 is stored at column 5 of the one row sum matrix 324 of the DDM 300. This value indicates that two different two-cycle at-speed tests (namely p1 and p2) are employable to detect the candidate fault/defect modeled in column 5. As noted, the defect analyzer generates a fault rules file that corresponds to the DDM 300. The fault rules file provides similar information as the DDM 300 in a format consumable by an IC test engine, such as the IC test engine 150 of FIG. 1.

Figure 3B:
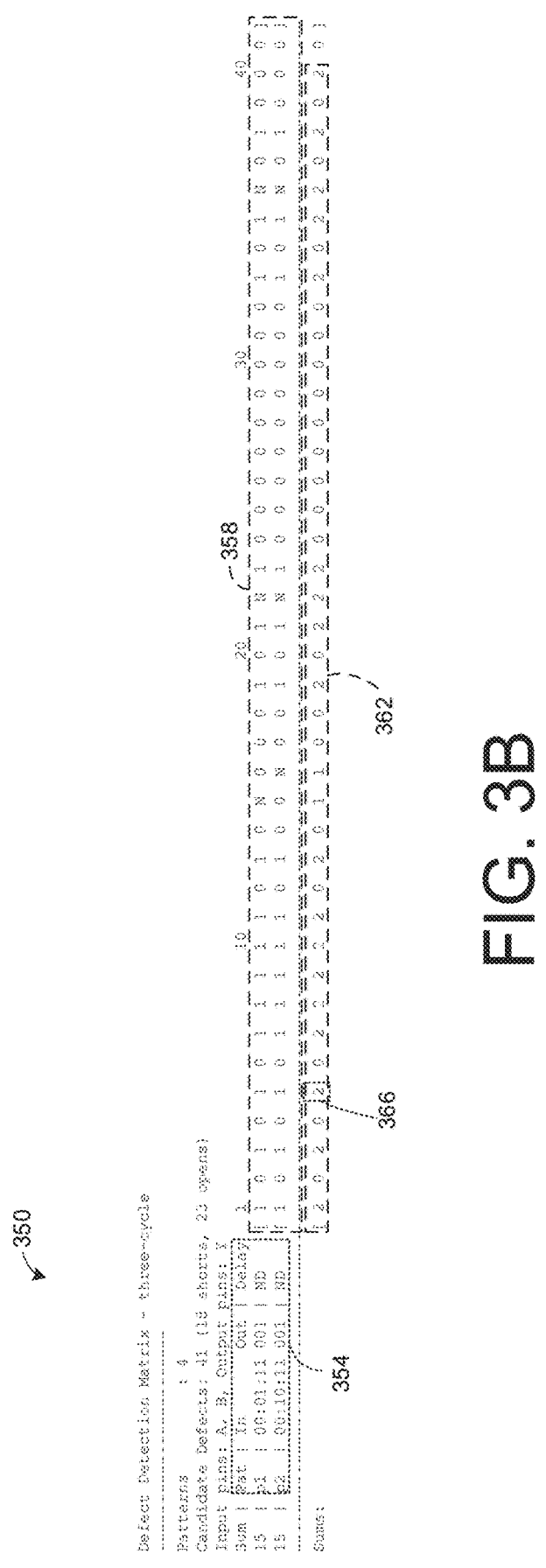

FIG. 3B illustrates an example of a DDM 350 that could represent the cell (an AND gate) in the given example that includes three-cycle at-speed test patterns (e.g., multicycle test patterns where N=3). In the DDM 350, a first box 354 identifies and characterizes two three-cycle test patterns, labeled p1 and p2. For instance, in the given example, the three-cycle at-speed test pattern p1 is labeled as (In) 00:01: 11, (Out) 001 and (ND) "ND". This labeling indicates that in a first test pattern, a logical 0 is applied to node A and to node B, and that an expected response at the output node, Y is a logical 0. This labeling also indicates that in a second test pattern, a logical 0 is applied to node A, and a logical 1 is applied to node B, and that an expected response at the output node, Y is a logical 0. Additionally, this labeling further indicates that in a third test pattern, a logical 1 is applied to node A and to node B, and that the expected response at the output node, Y is a logical 1. Furthermore, the labeling "ND" of p1 represents a recorded nominal delay, Delaynom for the test pattern, p1 (e.g., the transition delay for a defect-free version of the cell). Values at "ND" are stored as integer or fixed point/floating point values.

Additionally, the DDM 350 includes a 41 by 2 results matrix 358 wherein each of the 41 columns represents a recorded result of a corresponding three-cycle test pattern for a particular candidate fault/defect. That is, each column represents a response to two three-cycle test patterns, p1 and p2 by a particular version of the cell where one fault/defect is modeled. Values in the results matrix 358 of the DDM 350 recorded as a 0 indicate that the particular fault/defect did not have a detectable change on the operation of a cell for a corresponding test pattern. For instance, the value stored in the results matrix 358 at column 4, row 2 indicates that the three-cycle test pattern p2 (00:10:11; 001; "ND") in the first box 304 has a value of 0. This indicates that the three-cycle test pattern, p2 is not employable to detect the particular candidate fault/defect modeled in column 4.

Additionally, values in the results matrix 358 of the DDM 350 recorded as a 1 indicate that the particular fault/defect is a static fault/defect detected by the corresponding test pattern. For instance, the value stored at column 3, row 1 indicates that the three-cycle test pattern p1 (00:01:11; 001; "ND") has a value of 1. This indicates that the three-cycle test pattern, p1 is employable to detect a static fault/defect for the particular candidate fault/defect model in column 3.

Further, similar to the DDM 300 of FIG. 3A, in the DDM 350 of FIG. 3B, a recorded value of 'N' represents a percent deviation or a time deviation (e.g., in μs, ns or ps) from a corresponding nominal delay 'ND' caused by applying a corresponding test pattern for a particular candidate fault/defect.

The DDM 350 also includes a one row sum matrix 362 that stores integer values characterizing a number of test patterns p1 and p2 that are employable to detect a particular transition fault/defect. For instance, in a box 366, a value of 2 is stored at column 5 of the one row sum matrix 362 of the DDM 350. This value indicates that two different three-cycle tests (namely p1 and p2) are employable to detect the candidate fault/defect modeled in column 5. As noted, the defect analyzer generates a fault rules file that corresponds to the DDM 350. The fault rules file provides similar information as the DDM 350 in a format consumable by an IC test engine, such as the IC test engine 150 of FIG. 1.

Referring back to FIG. 1, the fault rules files 158 for each of the K number of cell types 134 of the cells 132 included in the IC design 108 are provided to the IC test engine 150 for the generation of test patterns for the fabricated IC chip 104 using ATPG techniques. In the examples provided, the test patterns generated by the IC test engine 150 are boundary model or non-cell-aware N-cycle at-speed test patterns, where N is an integer greater than one. Test-patterns are considered "cell-aware" because the cell-aware test patterns are generated based on candidate faults/defects within boundaries of the cells 132 of the IC design 108. That is, rather than the boundary model test patterns that treat each cell as a "black box", the cell-aware test patterns are tailored for specific fault/defect candidates that are possible based on the internal circuit design of cells.

As used herein, defects or faults that are characterized as "single cycle" refer to defects and faults, respectively in the fabricated IC chip 104 and the IC design 108 that are detectable with a single cycle test pattern. Additionally, defects or faults that are characterized as "at-speed transition" refer to defects and faults, respectively in the fabricated IC chip 104 and the IC design 108 that require a value transition (or multiple value transitions) operating at functional speed for testing and are only detectable with a multicycle test pattern. Some such multicycle transition at-speed faults/defects require two-cycles operating at functional speed, and some such multicycle transition at-speed faults/defects require three or more cycles operating at functional speed. Further still, some at-speed transition faults/defects are detectable with two or more cycles operating at functional speed, and two or more fault initialization cycles operating at functional speed or test speed.

Through sim-shifting, N-cycle at-speed test patterns with one fault initialization cycle in a scan shift window generated by the IC test engine 150 are employable to diagnose at-speed faults/defects with a single fault initialization cycle and multicycle fault/defects with two or more fault initialization cycles. More particularly, the diagnostics engine could perform fault simulation on an N-cycle at-speed test pattern utilizing sim-shifting. The diagnostics engine determines if one or more scan shift cycles prior to a capture window of the given N-cycle at-speed pattern establishes the additional initialization cycles required for fault excitation prior to launching the transition. In addition, the diagnostics engine will ensure that the launch pulse launches the necessary transition and the capture pulse enables observation of the transition on a primary output pin and/or at an observable scan flop.

As will be explained, the N-cycle at-speed test patterns with a single fault initialization cycle in the scan shift window are employable in place of cell-aware multicycle test patterns with two or more fault initialization cycles. An N-cycle at-speed test pattern has one fault initialization cycle when shift enable is asserted (shift window) and N number (two or more) cycles operating at functional speed where the shift enable is de-asserted (capture window). More generally, a multicycle test pattern includes one or more fault initialization cycles at test frequency (shift window) and N capture cycles (capture window), where N is an integer greater than or equal to two. Moreover, a cycle (e.g., cycle N−1) during the capture window in a multicycle test pattern is the launch cycle (alternatively referred to as a fault excitation cycle) which creates the transition on a cell pin (e.g., alternatively referred to as a cell node) needed to detect a fault/defect and another cycle (e.g., cycle N) captures the transition on a primary output pin or on an observable scan flop (or multiple observable scan flops). Additionally, the remaining cycles of the capture window (if any), namely cycle 1 to cycle N−2, are fault initialization cycles which facilitate the needed conditions for the fault or defect to be detected. Stated differently, the cycle N−1 is also referred to as a launch cycle that creates the transition on the node of a cell needed to detect a fault or defect. Furthermore, the cycle N is also referred to as a capture cycle which captures (or observes) the fault or defect on a primary output pin or observable scan flop(s). As one example, in a two-cycle at-speed test pattern (such that N is equal to 2), the capture cycle is cycle 2 (cycle N), and the launch cycle is cycle 1 (cycle N−1). As another example, in a three-cycle test pattern (such that N is equal to 3), the capture cycle is cycle 3 (cycle N), the launch cycle is cycle 2 (cycle N−1), and cycle 1 is the fault initialization cycle along with the last shift cycle prior to the capture window. In still another example, in a ten cycle at-speed test pattern (such that N is equal to 10), the capture cycle is cycle 10 (cycle N), the launch cycle is cycle 9 (cycle N−1) and cycles 1-8 (cycles 1 to N−2) are fault initialization cycles along with the last shift cycle prior to the capture window.

Figure 4:
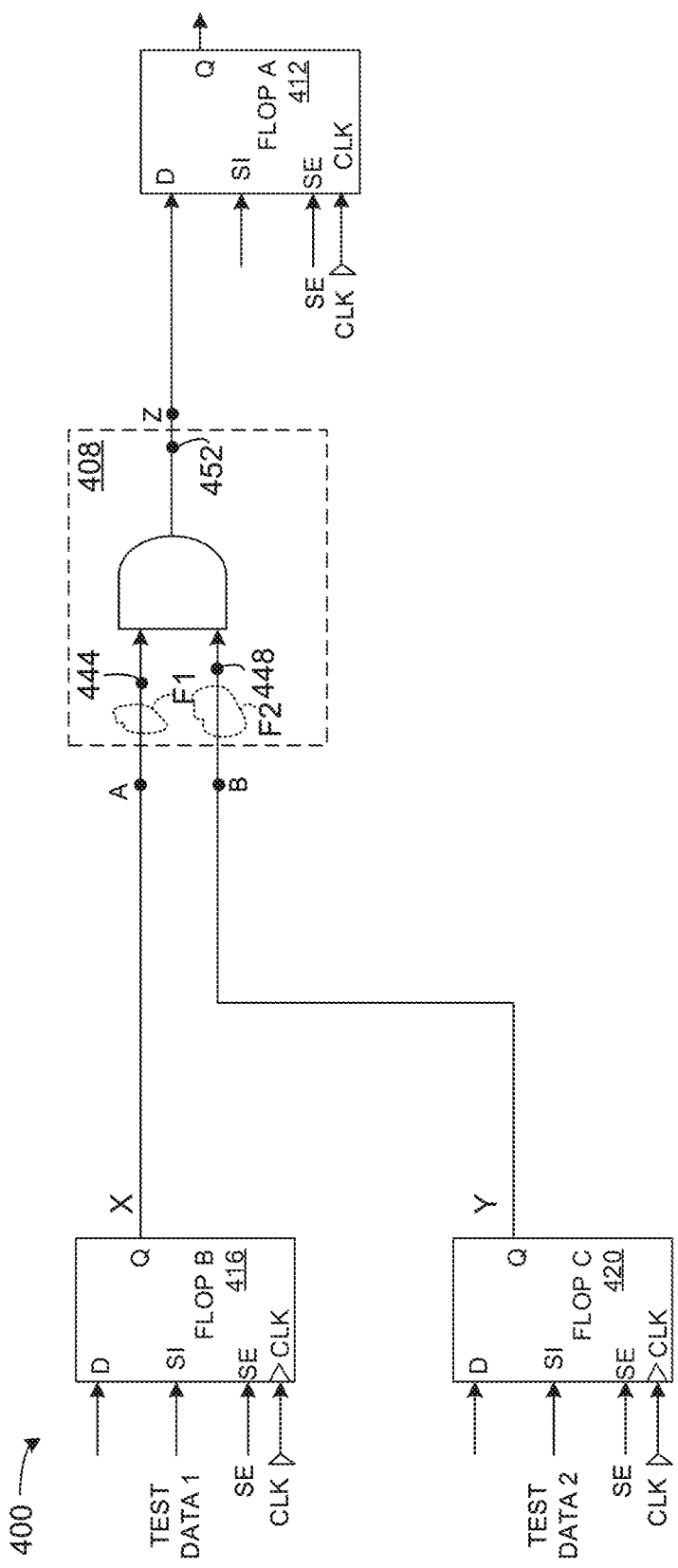
FIG. 4 illustrates an example of a portion of an IC design for testing a candidate defect in an IC design.

A scan chain is formed of scan flops that are included in the IC design 108 to propagate test patterns through the IC design 108. Moreover, some such transition defects require multiple cycles of data to propagate a value to a cell 132 that contains potential faults/defects. To demonstrate this concept, continuing with the given example, FIG. 4 illustrates an example of a portion of an IC design 400 that is employable to test for boundary model and cell-aware transition faults/defects of an AND gate 408 (e.g., a cell, namely the AND gate of the given example). Moreover, continuing with the given example, cell-aware test patterns for the AND gate 408 are characterized by the DDM 300 of FIG. 3A and the DDM 350 of FIG. 3B.

A two-cycle at-speed test pattern (a particular type of at-speed test pattern, such that N=2) has a single fault initialization cycle to load one or more scan chains with desired values during scan shift windows, followed by a launch cycle and a capture cycle operating at functional speed during a capture window to capture an observable effect into scan flops and then shift out the captured values through the scan chains to scan outputs. The clock pulses in the capture window of an at-speed multicycle pattern are fast clock cycles using a functional clock period. The value loaded by the last scan shift into the scan flops provides the conditions needed to excite the transition fault to be tested. The design is put in functional mode during the capture window and the capture cycle observes the fault effect at an observable scan flop.

Conversely, other multicycle test patterns have more than two-cycles in the capture window. For instance, a three-cycle multicycle test pattern (e.g., N=3), also has a fault initialization cycle to load one or more scan chains with desired values during the shift window, followed by three pulses during the capture window to observe the fault effect at observable scan flops and then shift out the captured values through the scan chains to scan outputs. In some three-cycle test patterns, the values loaded by a scan shift into the scan flops provide a first fault initialization value while the first capture clock pulse (the pulse N−2) provides a second fault initialization value. Additionally, the next pulse (N−1), is a launch cycle that creates a transition on the cell input and output. The last capture cycle (N) is a capture cycle to enable observation of the fault effect into the scan flop.

Some boundary model transition faults/defects as well as some cell-aware faults/defects employ a two-cycle test pattern (N=2), and need a single fault initialization cycle, as illustrated by the DDM 300 of FIG. 3A. Further, as illustrated by the DDM 350 of FIG. 3B, other cell-aware transition faults/defects, such as opens and/or shorts require two fault initialization cycles. Still other transition faults/defects require more than two fault initialization cycles.

The portion of an IC design 400 includes three scan flops (labeled "flop"), namely, scan flop A 412, scan flop B 416 and scan flop C 420. Each scan flop includes a data input port, (labeled D), a scan-input port (labeled SI), a scan enabled port (labeled SE) and a clock input port (labeled CLK). Additionally, each scan flop includes an output port (labeled Q). For purposes of simplification of explanation, some termination points and interconnections are omitted. For instance, in the present example, it is presumed that the scan flop A 412, the scan flop B 416 and the scan flop C 420 each receive the same scan enable signal, SE and the same clock signal, CLK.

The output port, Q of the scan flop B 416 is coupled to an input A 444 of the AND gate 408. Additionally, the output port, Q of the scan flop C 420 is coupled to an input B 448 of the AND gate 408. Accordingly, the scan flop B 416 and the scan flop C 420 are both upstream from the AND gate 408. Additionally, an output Z 452 of the AND gate 408 is coupled to a data input port, D of the scan flop A 412. Accordingly, the scan flop A 412 is downstream from the AND gate 408.

The scan enable signal, SE provides a multiplexer (MUX) control signal for the scan flop A 412, the scan flop B 416 and the scan flop C 420. In the examples illustrated, it is presumed that the scan enable signal, SE is an active high signal, but in other examples, the scan enable signal can be an active low signal. During time intervals that the scan enable signal, SE is asserted (e.g., logical 1), the scan flop A 412, the scan flop B 416 and the scan flop C 420 are configured to pass a value received at the scan-input port, SI to the output port, Q. Conversely, during time intervals that the scan enable signal, SE is de-asserted (e.g., logical 0), the scan flop A 412, the scan flop B 416 and the scan flop C 420 are configured to pass a value received at the data input port, D to the output port, Q.

The scan flop A 412, the scan flop B 416 and the scan flop C 420 are connected to each other in scan paths of a scan chain. More specifically, the scan flop B 416 the AND gate 408 are arranged to provide a scan path for a first test data signal, TEST DATA 1. The scan flop C 420 and the AND gate 408 are arranged to provide a scan path for a second test data signal, TEST DATA 2. The AND gate 408 combines the output of the scan flop A 412 and the scan flop B 416 to derive the output Z 452 that is captured by the scan flop A 412. The first test data signal, TEST DATA 1 is provided to the scan-input, SI of the scan flop B 416 and the second test data signal, TEST DATA 2 is provided to the scan-input, SI of the scan flop C 420. The first test data signal, TEST DATA 1 can be synchronized with the second test data, TEST DATA 2 to provide values for testing the AND gate 408 (one or more fault sites) with a particular instance of a test pattern. The IC design 400 is arranged such that if the scan enable signal, SE is asserted (logical 1), the first test data signal, TEST DATA 1 propagates concurrently with the second test data signal, TEST DATA 2 toward the AND gate 408. Thus, a value read at the output, Q of the scan flop A 412 is evaluated to determine whether the particular candidate faults/defects (e.g., an open wire) are present within the AND gate 408. More specifically, if the value at the output of scan flop A 412 is different from an expected value when the first test data signal, TEST DATA 1 and the second test data signal, TEST DATA 2 are applied, there may be at least one fault/defect in the AND gate 408. For simplification of explanation, during propagation of the first test data signal, TEST DATA 1 and the second test data signal, TEST DATA 2, the Q output of scan flop B 416 is referred to as signal X, and the Q output of scan flop C 420 is referred to as signal Y. In the given example, there are two fault sites for two candidate faults, namely, a first fault/defect, F1 at the input A 444 of the AND gate 408 and a second fault/defect F2 at the input B 448 of the AND gate 408.

Referring back to FIG. 1, the IC test engine 150 can employ the ATPG techniques to generate test patterns 192. For the examples provided, it is presumed that the test patterns 192 are N-cycle at-speed test patterns with a fault initialization cycle during a scan shift window and N-cycles in the capture window that are employable to detect multi-cycle boundary model and cell-aware transition cycle faults/defects. However, as is explained, results of the application of such N-cycle at-speed test patterns that target multicycle transition faults/defects are employable for diagnosing multicycle cell-aware transition faults/defects that are conventionally only detectable with N+P number of at-speed cycles in a capture window.

The IC test engine 150 can output the test patterns 192. The test patterns 192 are employable by an ATE 194 to test the fabricated IC chip 104. In some examples, the test patterns 192 are stored in the memory 116 and/or the ATE 194 prior to execution of the testing. The ATE 194 can alternatively be referred to as an IC chip tester or an IC chip tester machine. The ATE 194 can be implemented as a hardware device that is electrically coupled to pins on the fabricated IC chip 104. In the examples illustrated, such pins can be coupled to the interface 140 of the fabricated IC chip 104.

The test patterns 192 employed by the ATE 194 contain stimuli to be applied to inputs and the expected values on the outputs of the fabricated IC chip 104. The ATE 194 records results of application of the test patterns 192 to the fabricated IC chip 104. The recorded results can be referred to as test result data.

Moreover, the test result data can identify expected values and miscompare values that may (or may not) be measured by the ATE 194, which cause particular instances of test patterns in the test patterns 192 to fail. A miscompare refers to an unexpected test result value. For instance, in the IC design 400 of FIG. 4, if a given N-cycle at-speed test pattern is applied that causes the scan flop B 416 to be initialized to a logical 1 and output a logical 1 on the input A 444 of the AND gate 408 on the launch clock cycle, and the scan flop C 420 to be initialized to a logical 1 and transition to an output of a logical 0 on the input B 448 of the AND gate 408 on the launch clock cycle, the output Z 452 of the AND gate 408 has an expected value transitioning from a logical 1 to 0 within a given transition time (e.g., defined by the DDM 300 of FIG. 3A or the DDM 350 of FIG. 3B). Thus, an output, Q of the scan flop A 412 reads as a value of 0 in response to the given test pattern that causes the input A 444 to be a 1 (an expected value) and the input B 448 to be a 0 within the given transition time would considered to have passed the given test pattern. Conversely, an output, Q of the scan flop A 412 read as a value of 1 in response to the given N-cycle at-speed test pattern after the given transition time would be a miscompare value and would be considered to have failed the given test pattern.

The memory 116 of the computing platform 112 can also execute a diagnostics engine 196. The diagnostics engine 196 can receive the test patterns 192 and the test result data from the ATE 194. Additionally, in some examples, the diagnostics engine 196 can receive a copy of the fault rules files 158 provided from the fault rules engine 154. The diagnostics engine 196 can employ the test patterns 192 and the test result data to determine a cause of one or more failures in the fabricated IC chip 104.

Measures within the test patterns 192 that result in miscompares (unexpected values) in test result data can be categorized as tester failed (TF). Measures within the test patterns 192 that result in expected values in test result data can be categorized as tester passed (TP). Furthermore, the diagnostics engine 196 can include a fault simulator that fault-simulates a subset of the N-cycle at-speed test patterns of the test patterns 192 using sim-shifting and determines if application of a subset of the N-cycle at-speed test patterns in the test patterns 192 mimics application of N+P at-speed test patterns, such that an N-cycle at-speed test pattern of such a subset of N-cycle at-speed test patterns 192 is employable to detect a multicycle transition candidate fault/defect (or multiple multicycle candidate faults/defects) that are conventionally only detectable with an N+P at-speed test pattern (e.g., a test pattern with more than N number of cycles in the capture window). Stated differently, the diagnostics engine 196 employs the fault simulator 197 to fault-simulate the subset of the N-cycle at-speed test patterns against fault models with candidate faults/defects that are potentially detected by the subset of N-cycle at-speed test patterns. The candidate faults/defects include boundary model and cell-aware multicycle transition faults/defects. The candidate faults/defects also include multicycle cell-aware transition cycle faults/defects that were not originally targeted by the test patterns 192. In this manner, the fault simulator 197 of the diagnostics engine 196 utilizes sim-shift techniques to diagnose a set of multicycle transition faults/defects in the fabricated IC chip 104 that are conventionally detectable only with N+P cycle test patterns, and utilizes fault simulation to diagnose a set of multicycle transition faults/defects that were not targeted by the test patterns 192. Such candidate faults/defects can include multicycle transition cell-aware defects, including the multicycle transition cell-aware defects identified in the DDM 350 of FIG. 3B. Furthermore, the diagnostics engine 196 can employ the fault simulator 197 to fault-simulate candidate faults/defects to determine the test patterns and measure locations, such as primary output pin(s) and/or observable scan flop(s), where a fault effect is observed. The test patterns and measure locations where the fault effect is measured with fault-simulation of the given fault/defect can be categorized as simulation failed (SF). The test patterns and measure locations where the fault effect is not measured with fault-simulation of the given fault/defect can be categorized as simulation passed (SP).

The diagnostics engine 196 scores the candidate faults/defects applicable to the subset of the N-cycle at-speed test patterns to determine the most likely fault(s)/defect(s) present in the fabricated IC chip 104. Specifically, the diagnostics engine 196 can combine the test result data recorded by the ATE 194 with the results of the fault-simulation and categorize each such result into one of four categories, TFSF, TSFP, TPSF and TPSP. TFSF (Tester Failed, Simulation Failed), indicates that a defect was measured by the ATE 194 (tester failed, TF) and that the fault-simulation predicted the fault (simulation failed, SF). TFSP (Tester Failed, Simulation Passed), indicates that a defect was measured by the ATE 194 (tester failed, TF) and that the fault-simulation did not detect the fault (simulation passed, SP). TPSF (Tester Passed, Simulation Failed), indicates that a defect was not measured by the ATE 194 (tester passed, TP) and that the fault-simulation predicted the fault (simulation failed, SF). TPSP (Tester Passed, Simulation Passed), indicates that a defect was not detected by the ATE 194 (tester passed, TP) and that the fault-simulation did not detect the fault (simulation passed, SP). These categories can be employed to score a probability (likelihood) of the presence of each candidate fault/defect, wherein TFSF and TPSP are positive scores (increasing the probability for a corresponding candidate fault/defect) and TFSP and TPSF are negative scores (decreasing the probability for the corresponding candidate fault/defect). Stated differently, the categories of TFSF and TPSP show consistency between the measured results of application of the test patterns 192 to the fabricated IC chip 104 and simulation of applicable test patterns 192 for particular candidate faults/defects, thereby increasing the probability that a corresponding candidate fault/defect is actually present in the fabricated IC chip 104. Conversely, the categories of TFSP and TPSF show an inconsistency between the measured results of application of the test patterns 192 to the fabricated IC chip 104 and the simulation of applicable test patterns 192 for particular candidate faults/defects, thereby decreasing the likelihood that a corresponding candidate fault/defect is present in the fabricated IC chip 104.

Figure 5:
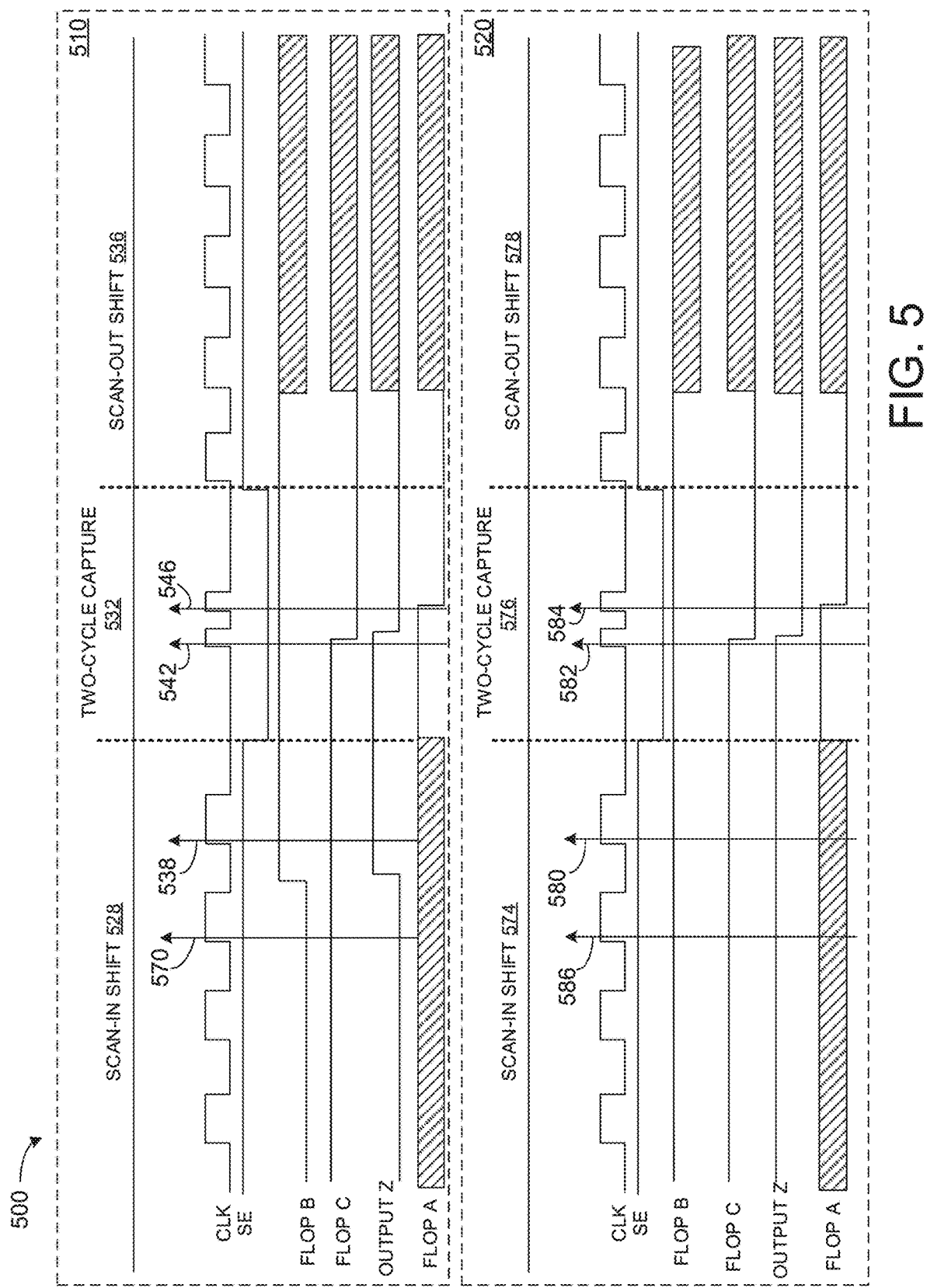
FIG. 5 illustrates a waveform diagram with a first set of waveforms and a second set of waveforms that represent waveforms of signals propagating through the IC design of FIG. 4.

As a demonstration of this concept, FIG. 5 illustrates a waveform diagram 500 with a first set of waveforms 510 and a second set of waveforms 520 that represent waveforms of signals propagating through the IC design 400 of FIG. 4. For purposes of illustration, the first set of waveforms 510 and the second set of waveforms 520 are plotted on the same timescale and the same reference numbers are employed in FIGS. 4 and 5 to denote the same structure. Further, it is presumed that Table 1 defines the states of the X and Y signals in the IC design 400 to excite the first fault/defect, F1 and the second fault/defect, F2.

TABLE 1

| Fault | X | Y |
|---|---|---|
| F1 | 0->1->1 | 1->1->0 |
| F2 | 1 | 1->0 |

The first set of waveforms 510 correspond to a first test pattern and the second set of waveforms 520 correspond to a second test pattern that represent application of a two-cycle (N=2) at-speed test pattern that cause an expected transition at the output Z from 1→0 at the of AND gate 408 in FIG. 4 within the functional time period of the path from scan flop C 420 to scan flop A 412. However, as illustrated, the timing of the application of the first test pattern corresponding to the first set of waveforms 510 and the timing of the second test pattern corresponding to the second set of waveforms 520 is different, which differences are utilized to improve diagnostics of faults.

Additionally, it is presumed that for the first set of waveforms 510, test result data (e.g., provided by the ATE 194 of FIG. 1) is analyzed by a diagnostic engine (e.g., the diagnostic engine 196 of FIG. 1), and this test result data indicates that a miscompare value was recorded for an applied clock time period (e.g., a transition was too slow), such that the first test pattern corresponding to the first set of waveforms 510 is recorded as tester failed (TF) by the diagnostics engine. Conversely, for the second set of waveforms 520, it is presumed that for the second set of waveforms 520, the test result data indicates that an expected value of a transition of 1→0 for an applied clock time period, such that the second test pattern corresponding to the second set of waveforms 520 is recorded as tester passed (TP) by the diagnostics engine.

Continuing with the given example, as demonstrated by Table 1, the first fault/defect, F1 is excited in situations where the X signal transitions from 0→1→1 and the Y signal transitions from 1→1→0. Similarly, the second fault/defect, F2 is excited in situations where the X signal is 1 and the Y signal transitions from 1→0. Thus, each time that the X and Y signals are patterned to excite the first fault/defect, F1, the second fault/defect, F2 is also excited. However, the converse is not true. That is, values of the X and Y signal that excite the second fault/defect, F2 do not necessarily excite the first fault/defect, F1.

The first set of waveforms 510 includes a scan-in shift window 528, a two-cycle capture window 532 and a scan-out shift window 536. In the first set of waveforms 510, a scan-enable signal, SE is asserted (logical 1) during the scan-in shift window 528 and the scan-out shift window 536. The first set of waveforms 510 represents a two-cycle (N=2) at-speed test pattern that causes an output of scan flop A 412 to transition from a logical 1 to a logical 0 during the two-cycle capture window 532 that is generated to detect a candidate fault/defect in an IC chip, such as an open or a short. In the example illustrated, the candidate fault/defect is a cell-aware transition fault/defect.

During the scan-in shift window 528 the clock signal, CLK operates at a test frequency, and the scan-enable signal, SE is asserted (logical 1). During the two-cycle capture window 532, the clock signal, CLK operates at a functional frequency. The test frequency is usually at least one order of magnitude slower than the functional frequency of an IC chip that includes the scan path. For example, if the functional frequency of the IC chip is 1 gigahertz (GHz), the test frequency of the scan path could be 100 megahertz (MHz) or less. During the scan-in shift window 528, values of test data are loaded into the scan paths and propagated through the scan path of the IC design 400.

During the scan-in shift window 528, a fault initialization cycle 538 occurs in response to the last cycle of the clock signal, CLK prior to the two-cycle capture window 532, which is alternatively referred to as a shift clock cycle. At the fault initialization cycle 538, the scan flop B 416 (labeled "FLOP B" in FIG. 5) provides an output, Q of logical 1, and the scan flop C (labeled "FLOP C" in FIG. 5) also provides an output Q of logical 1. Additionally, a launch cycle 542, occurs in response to the first cycle of the clock signal, CLK during the two-cycle capture window 532. The output, Q of scan flop B 416 remains at 1 for the remainder of the two-cycle capture window 532. In the first set of waveforms 510, at the start of the two-cycle capture window 532, the scan-enable signal, SE is de-asserted (e.g., logical 0), and the clock signal, CLK is inhibited from pulsing at regular intervals. Additionally, at the start of the two-cycle capture window 532, a fault simulator of the IC test engine (e.g., the fault simulator 197 of FIG. 1) is activated. In response to activation, the fault simulator verifies that a logical 1 is input to input B 448 of the AND gate 408. Accordingly, the fault simulator is activated to verify if correct values are available for the fault initialization cycle 538 and the launch cycle 542.

The first set of waveforms 510 also elicits a capture cycle 546 during the two-cycle capture window 532, which is implemented as a second clock cycle of the clock signal, CLK during the two-cycle capture window 532. During the two-cycle capture window 532, the clock signal, CLK operates at the functional frequency of the IC design. At the end of the two-cycle capture window 532, the scan-enable signal, SE is re-asserted (logical 1), and the fault simulator is disabled, transitioning to a scan-out shift window 536. Additionally, during the scan-out shift window 536, the clock signal, CLK returns to providing cycles at the test frequency.

As illustrated, the last scan shift 538 in the shift window 528 loads the scan flop B and the scan flop C with a value of 1. It is assumed in the example illustrated that the other values feeding the D input of scan flop B and scan flop C are 1 and 0 respectively at the end of the last scan shift. Hence, a value of 1→1 gets applied at the output of scan flop B 416 from the last scan shift 538 and the launch cycle 542. Additionally, a value of 1→0 gets applied at the output of scan flop C 420 from the last scan shift 538 and launch cycle 542. Accordingly, the output, Q of the scan flop B 16 has a pattern of 1→1 (the X signal) and the output, Q of the scan flop C 420 has a pattern of 1→0 during the test pattern applied by the first set of waveforms 510.

Further, through simshifting, the first set of waveforms 510 are also fault simulated against a fault model that includes the first fault/defect, F1. More specifically, as illustrated in this example, the cycle 538 is the last scan shift, the cycle 542 is the launch cycle and the cycle 546 is the capture cycle. The fault simulator can evaluate the state of the output, Q of the scan flop B 416 and the scan flop C 420 at the second to last scan shift cycle, which is evaluated as an extra fault initialization cycle 570. As illustrated, in response to the extra fault initialization cycle 570, the output, Q of the scan flop B 416 (signal X) transitions from 0 to 1 and the output, Q of the scan flop C 420 (signal Y) remains at 1. Thus, through simshifting, the output, Q of the scan flop B 416 has a pattern of 0→1→1 (the X signal) during the test pattern applied by the first set of waveforms 510. Similarly, through simshifting, the output, Q of the scan flop C 420 has a pattern of 1→1→0. Examining Table 1 reveals that an X signal pattern of 0→1→1 and a Y signal pattern of 1→1→0 can excite the first fault/defect, F1. Thus, the first set of waveforms 510 can excite the first fault/defect, F1 and the second fault/defect, F2. Accordingly, the first set of waveforms 510 shows how the fault simulator utilizes sim-shifting to determine if the intended two-cycle at-speed test pattern targeting a delay fault/defect, which traditionally requires one fault initialization cycle, could also potentially detect multicycle delay faults/defects requiring two or more initialization cycles (extra fault initialization cycles).

Additionally, in response to the capture cycle 546, the scan flop A 412 captures the Z output of the AND gate 408 that is employable to determine whether a fault/defect is present at in the AND gate 408. More particularly, as an example, if the output of the AND gate 408 transitions from 1 to 0 (or vice versa) over an interval of time longer than the time period (based on a clock operating at functional clock speed) of the path between the scan flop C 420 and the scan flop A 412 and the input values of the AND gate 408 correspond to one of the conditions to trigger a fault/defect in the AND gate 408 as determined by the DDM 300 of FIG. 3A and/or the DDM 350 of FIG. 3B, it is determined that a fault/defect may be present in the AND gate 408. A defect free circuit would observe the transition from 1 to 0 within the interval of time allowed by the clock period of the path from the scan flop C 420 to the scan flop A 412. If either (or both) of the first fault/defect, F1 or the second fault/defect, F2 is/are present in real silicon, the present fault results in this 1 to 0 transition reaching the observe scan flop A 412 later than the allowed time, resulting in a miscompare being detected. More specifically, during execution of the test patterns characterized by the first set of waveforms 510 on a fabricated IC chip (e.g., the fabricated IC chip 104 of FIG. 1) by analyzing test result data with a diagnostics engine (e.g., the diagnostics engine 196 of FIG. 1), if the value at the output, Q of the scan flop A 412 ("FLOP A") is an expected result, this expected result indicates that the candidate fault/defects (e.g., the first fault/defect, F1 and the second fault/defect, F2) are not present in the fabricated IC chip. Conversely, if the value at the output, Q of the scan flop A 412 is an unexpected result, this unexpected result indicates that a fault (e.g., the first fault/defect, F1 and/or the second fault/defect, F2) is possibly present in the fabricated IC chip, such that the fabricated IC chip may not function correctly. In the example illustrated, the output Z ("OUTPUT Z") of the AND gate 408 transitions from a logical 1 to 0 before the start of the capture cycle 546. Additionally, the output value Q of the scan flop A 412 is a logical 0 after the capture cycle 546. In this example, it is assumed that flop A 412 records a miscompare when the pattern corresponding to FIG. 3A is applied on the fabricated IC chip on the ATE. That is, a logic value of 1 is recorded after the capture cycle 546 on the ATE, which indicates that fault/defects F1 and/or F2 may be present on the fabricated IC chip.

The second set of waveforms 520 represents another two-cycle at-speed test pattern with sim-shifting applied such that the sim-shifted two-cycle at-speed test pattern is simulated against a fault model that includes the first fault/defect, F1 and the second fault/defect, F2. Accordingly, in the examples provided, it is presumed that a fault simulator (e.g., the fault simulator 197 of FIG. 1) fault simulated the existing two-cycle at-speed test pattern and determined that sim-shifting the two-cycle at-speed test pattern does not enable the two-cycle at-speed test pattern to detect the same candidate fault/defects (e.g., a multicycle cell-aware delay fault/defect) that are detectable with the two-cycle test pattern characterized by the first set of waveforms 510.

More specifically, the second set of waveforms 520 includes a scan-in shift window 574, a two-cycle capture window 576 and a scan-out shift window 578. In the second set of waveforms 520, a scan-enable signal, SE is asserted (logical 1) during the scan-in shift window 574 and the scan-out shift window 578. The second set of waveforms 520 represents a two-cycle (multicycle, N=2) at-speed test pattern that causes an output of scan flop A 412 to transition from a logical 1 to a logical 0 during the two-cycle capture window 576 that is generated to detect a candidate transition fault/defect in an IC chip.

During the scan-in shift window 574 the clock signal, CLK operates at the test frequency and the scan-enable signal, SE is asserted (logical 1). During the two-cycle capture window 576, the clock signal, CLK operates at the functional frequency. During the scan-in shift window 574, values of test data are loaded into the scan-in, SI port of the scan flop B 416 and the scan flop C 420.

For the second set of waveforms 520, during the scan-in shift window 574, a fault initialization cycle 580 occurs in response to a cycle of the last clock cycle prior to the two-cycle capture window 576. In the second set of waveforms 520, at the start of the two-cycle capture window 576, the scan-enable signal, SE is de-asserted (e.g., logical 0), and the clock signal, CLK is inhibited from pulsing at regular intervals. Additionally, the two-cycle capture window 576 includes a launch cycle 582 and a capture cycle 584 that operate in a similar manner to the launch cycle 542 and the capture cycle 546 of the two-cycle capture window 532 of the first set of waveforms 510. Additionally, in response to the capture cycle 584, the scan flop A 412 captures the output of the AND gate 408 to determine the effect (if any) on a candidate fault/defect if the fault/defect is present in the IC design targeted by the second set of waveforms 520.

At the fault initialization cycle 580, the scan-in input, SI of scan flop B 416 (labeled "FLOP B" in FIG. 5) and the scan-in input, SI of scan flop C 420 (labeled "FLOP C") are loaded such that the output, Q of scan flop C 420 transitions to a logical 0 in response to the launch cycle 582 during the two-cycle capture window 576. Additionally, the output Q of the scan flop B 416 (labeled "FLOP B") remains a constant logical 1. Accordingly, continuing with the given example, the output, Q of the scan flop C 420 has a pattern of 1→0 (the Y signal) during the test pattern applied by the second set of waveforms 520. Examining Table 1 reveals that an X signal pattern of 1→1 and a Y signal pattern of 1→0 can excite the second fault/defect, F2.

Additionally, in the second set of waveforms 520, the IC test engine activates the fault simulator, such that the window observed by the fault simulator moves to evaluate a portion of the scan-in shift window 574 as extra fault initialization cycles. Accordingly, in the second set of waveforms 520, the fault simulator is activated during the scan-in shift window 574, while the scan-enable signal, SE is asserted (e.g., logical 1). Accordingly, the fault simulator fault simulates the second set of waveforms 520 against a fault model that includes the first fault/defect, F1. More particularly, the fault simulator fault simulates the second to last scan shift cycle 586 as an extra fault initialization cycle. As illustrated, the output Q of the scan flop B 416 and the scan flop C 420 remain a constant logical 1 during scan shift cycles 586 and 580. Thus, through simshifting, the output, Q of the scan flop B 416 has a pattern of 1→1→1 (the X signal) during the test pattern applied by the first set of waveforms 510. Similarly, through simshifting, the output, Q of the scan flop C 420 has a pattern of 1→1→0. Examining Table 1 reveals that an X signal pattern of 1→1→1 and a Y signal pattern of 1→1→0 does not excite the first fault/defect, F1. Thus, the second set of waveforms 510 can excite the second fault/defect, F2, but not the first fault/defect, F1.

After execution of the test pattern represented by the second set of waveforms 520 on a fabricated IC chip (e.g., the fabricated IC chip 104 of FIG. 1) test result data for the test pattern is analyzed by a diagnostics engine (e.g., the diagnostics engine 196 of FIG. 1). The diagnostics engine is configured such that if the value at the output, Q of scan flop A 412 is an expected result, this indicates that the candidate fault/defect F2 is not present in the IC chip. Conversely, if the value at the output, Q of scan flop A 412 is an unexpected result, this unexpected result indicates that the candidate fault/defect F2 is possibly present in the fabricated IC chip, and the fabricated IC chip may not function correctly. In the example illustrated, the OUTPUT Z of the AND gate 408 transitions from logical 1 to 0 in response to the launch cycle 582 and prior to the capture cycle 584. The output of scan flop A 412 records an expected result of 0, indicating the fault/defect F2 is not present.

At the end of the two-cycle capture window 576, the scan-enable signal, SE is re-asserted (logical 1), and the fault simulator is disabled, transitioning to the scan-out shift window 578. Additionally, during the scan-out shift window 536, the clock signal, CLK returns to providing cycles at the test frequency. As compared to the first set of waveforms 510, in the second set of waveforms 520, the extra fault initialization cycle 570 of the first set of waveforms 510 causes the output, Q of the scan flop B 416 to transition to logical 1. Conversely, the extra fault initialization cycle 586 of the second set of waveforms 520 does not cause either the output Q of the scan flop B 416 or the scan flop C 420 to change.

Continuing with the given example, as explained, the fault simulator (e.g., the fault simulator 197 of FIG. 1) in the diagnostics engine simulates ATPG test patterns corresponding to both the first set of waveforms 510 and the second set of waveforms 520 against the fault model (or fault models) that includes the first fault/defect, F1 and the second fault/defect, F2. Suppose that in the given example (and illustrated in FIG. 4), the first set of waveforms 510 results in a miscompare at the scan flop A 512, indicating that a transition from 1 to 0 had a delay that exceeded the time interval allowed by the DDM 300 of FIG. 3A and/or the DDM 350 of FIG. 3B (indicating a status of tester failed (TF) for the first set of waveforms 510). Additionally, suppose that in the given example, the second set of waveforms 520 results in a good compare at the scan flop A 512, indicating that a transition from 1 to 0 had a delay that within the time interval allowed by the DDM 300 of FIG. 3A and/or the DDM 350 of FIG. 3B (indicating a status of tester passed (TP) for the second set of waveforms 520). By evaluating the results of the test pattern applied by the first set of waveforms 510 and the second set of waveforms 520 in concert, the diagnostics engine (e.g., the diagnostics engine 196 of FIG. 1) can determine that the first set of waveforms 510 can excite the first fault/defect, F1 and/or the second fault/defect, F2. However, the diagnostics engine can also determine that the second set of waveforms 520 can only excite the second fault/defect, F2 (and not the first fault/defect, F1). Thus, taken together, the diagnostics engine can determine that it is more likely that the first fault/defect, F1 is present in the IC chip than the second fault/defect, F2. In particular, if the second fault/defect, F2 was present, the second set of waveforms 520 would have likely resulted in a miscompare. Thus, by utilizing sim-shifting during fault simulation of the test pattern represented in the first set of waveforms 510 and the second test pattern represented in the second set of waveforms 520 against both the first fault/defect, F1 and the second fault/defect, F2, the accuracy of fault detection is improved. In the absence of sim-shifting, only fault/defect F2 would have been fault simulated.

Fault-simulating the second fault/defect, F2 can reveal that the transition to 0 would be detectable by the first test pattern or the second test pattern, whether or not sim-shifting is applied. Thus, in relation to the second fault/defect, F2, the fault-simulation marks the measure on flop A 412 during both the first and second test patterns as simulation failed (SF). In contrast, fault-simulating the first fault/defect, F1 reveals that the transition to 0 defect is not detectable without sim-shifting, because the first fault/defect, F1 requires excitation with an at-speed test pattern with at least two fault initialization cycles. Accordingly, with consideration of sim-shifting N-cycle at-speed test patterns to mimic the operations of N+P multicycle test patterns, the shift cycles of the scan-in shift windows 528 and 574 are respectively fault-simulated as fault initialization cycles of a multicycle pattern. The first test pattern applied by the first set of waveforms 510 causes the condition of X having a pattern of 0→1→1 and Y having a pattern of 1→1→0, such that the first test pattern can excite the first fault/defect, F1 and/or the second fault/defect, F2. Accordingly, in relation to the first fault/defect, F1 and also the second fault/defect, F2, the diagnostics engine can categorize the measure on flop A 412 as simulation failed (SF) for the first test pattern. Simshifting of the second test pattern applied by the second set of waveforms 520 causes the condition X having a pattern of 1→1→1 and Y having a pattern of 1→1→0, such that the conditions for detecting the first fault/defect, F1 (X having a pattern of 0→1→1) is not met. Because the conditions for detecting the first fault/defect, F1 are not met by the second pattern, the measure on flop A 412 for fault F1 during the second pattern is scored as simulation passed (SP). The conditions for detecting the second fault/defect, F2 are met by the second pattern, hence the measure on flop A 412 for fault F2 during the second pattern is scored as simulation failed (SF).

The diagnostics engine can combine the test results recorded by the ATE, tester failed (TF) or tester passed (TP) with the results of the fault-simulation, simulation failed (SF) or simulation passed (SP) and categorize each such result into one of four categories, TFSF, TSFP, TPSF and TPSP. Table 1 illustrates a summary of the findings of the diagnostics engine in relation to the application of the first test pattern applied by the first set of waveforms 510 and the second test pattern applied by the second set of waveforms 520 for the first fault/defect, F1 and the second fault/defect, F2. The category of TFSF or TPSP are positive scores and the categories of TSFP or TSSF are negative scores. Accordingly, the diagnostics engine aggregates a simulated testability and the N-cycle at speed test pattern results for two or more test patterns of the subset of the N-cycle at-speed test patterns. More generally, the diagnostics engine aggregates fault simulation results and test result data for two or more measures from a given test pattern.

TABLE 2

| FAULT | FIRST TEST PATTERN | SECOND TEST PATTERN | SCORE WITH SIM-SHIFT |
|---|---|---|---|
| F1 | TFSF (+) | TPSP(+) | 100% EXPLAINS |
| F2 | TFSF (+) | TPSF(−) | 50% EXPLAINS |

As illustrated in Table 2, utilizing sim-shifting during diagnostics fault simulation of the first fault/defect, F1 against the first test pattern implemented with the first set of waveforms 510 and the second test pattern implemented by the second set of waveforms 520 gives results (TFSF and TPSP) consistent with the measurements from the result data recorded by the ATE (e.g., the ATE 194 of FIG. 1) of the first test pattern and the second test pattern. Conversely, the diagnostics engine that includes fault-simulation utilizing sim-shifting also reveals that the fault-simulation of the second fault/defect, F2 is inconsistent with the results (TPSF) of the second test pattern measured by the diagnostics engine analyzing the result data. Accordingly, in the given example, the diagnostics engine determines and reports that there is a greater probability that the first fault/defect, F1, is present in the fabricated IC chip (e.g., the fabricated IC chip 104 of FIG. 1) than the second fault/defect, F2. In the absence of sim-shifting, the diagnostics engine would not have fault simulated F1. The first pattern would score TFSP and second pattern would score as TFSF. Hence, the overall score would be only 50% since the results of the first pattern does not match the observed values on the tester and the fault simulation results.

More generally, in examples where other candidate faults/defects require three or more clock cycles (N>=3) for detection by virtue of a two or more initialization cycles requirement, each of the clock cycles from 1 to cycle N−2 (fault initialization) can be executed during the scan-in shift window 574 of the second set of waveforms 510 and/or the scan-in shift window 574 of the first set of waveforms 510.

Moreover, changes at the output Q of the scan flop B 416 and the scan flop C 420 can be evaluated to determine which (if any) faults are excitable to further improve the accuracy of fault detection.

Referring back to FIG. 1, by categorizing a combination of fault simulation and test results from the test result data, the diagnostics engine 196 can determine a candidate fault/defect that is the most likely cause of a defect measured by the ATE 194. More particularly, the diagnostics engine 196 can compare the test result data for a first set of transition faults/defects (for which the N-cycle at-speed test patterns are originally targeted) and other multicycle transition faults/defects detectable by the N-cycle at-speed test patterns (e.g. multicycle transition cell-aware defects). The diagnostics engine 196 can also examine results of sim-shifting the N-cycle at-speed test patterns, and applying these sim-shifted N-cycle at-speed test patterns to a second set of candidate faults/defects (e.g., multicycle transition cell-aware defects) that are only detectable with N+P cycle at-speed test patterns to detect the second set of candidate faults/defects to determine a first probability that the observed miscompare values of the test results is caused by a transition fault of the first set of transition faults/defects and a second probability that the miscompare values of the test result data is caused by a transition fault of the second set of transition faults/defects. Accordingly, the diagnostic engine 196 can compare the test result data and fault simulation results for the faults and/or defects in a combination of the first set and the second set of transition faults and/or defects to determine an order of probability that miscompare values for the test result data are caused by a particular transition fault and/or defect and other transition faults and/or defects. The diagnostics engine 196 can generate a diagnostics report that includes data characterizing a most likely fault/defect as a cause for every test pattern measure (or some subset thereof) wherein a miscompare was reported in the test result data. The diagnostic report can be employed, for example to determine the most likely fault/defect in the fabricated IC chips 104 failing on the ATE 194 within required operating specifications (e.g., within acceptable tolerances). This information can be used to improve the manufacturing process to alleviate the source of failing fabricated IC chips 104 and improve yield metrics such as DPPM (defective parts per million).

Furthermore, in some situations, the diagnostic report generated by the diagnostics engine 196 is employable to determine whether a manufacturing process or the IC design 108 is causing a fault/defect or if the fault/defect is an anomaly. For example, if the diagnostic report of multiple instances of the fabricated IC chip 104 reveals the same fault/defect, a reviewer of the diagnostic reports might determine that changes are needed to the IC design 108 and/or a manufacturing process to avoid the fault/defect for future instances of the fabricated IC chip 104. Conversely, in examples where the diagnostic reports of multiple instances of the fabricated IC chip 104 indicates that the faults/defects are occurring randomly, a reviewer of the diagnostic reports might determine that faults/defects are caused by uncontrollable environmental problems (e.g., temperature, dust, etc.) and that no changes are needed to the IC design 108 or the manufacturing process for the fabricated IC chip 104.

By employing the diagnostics engine 196, in examples where the test patterns 192 generated by the IC test engine 150 include N-cycle at-speed test patterns testing for transition faults/defects, the results of application of the test patterns 192 can be parsed, and employed to test for transition faults/defects that require N+P cycle at-speed test patterns that were not originally targeted by the test patterns 192. In particular, as demonstrated, the diagnostics engine 196 can sim-shift such N-cycle at-speed test patterns to leverage previously ignored information present in the test result data generated by the ATE 194. Such sim-shifting can improve the accuracy in predicting a cause of faults in the fabricated IC chip 104 without requiring additional tests to be executed separately.

Figure 6:
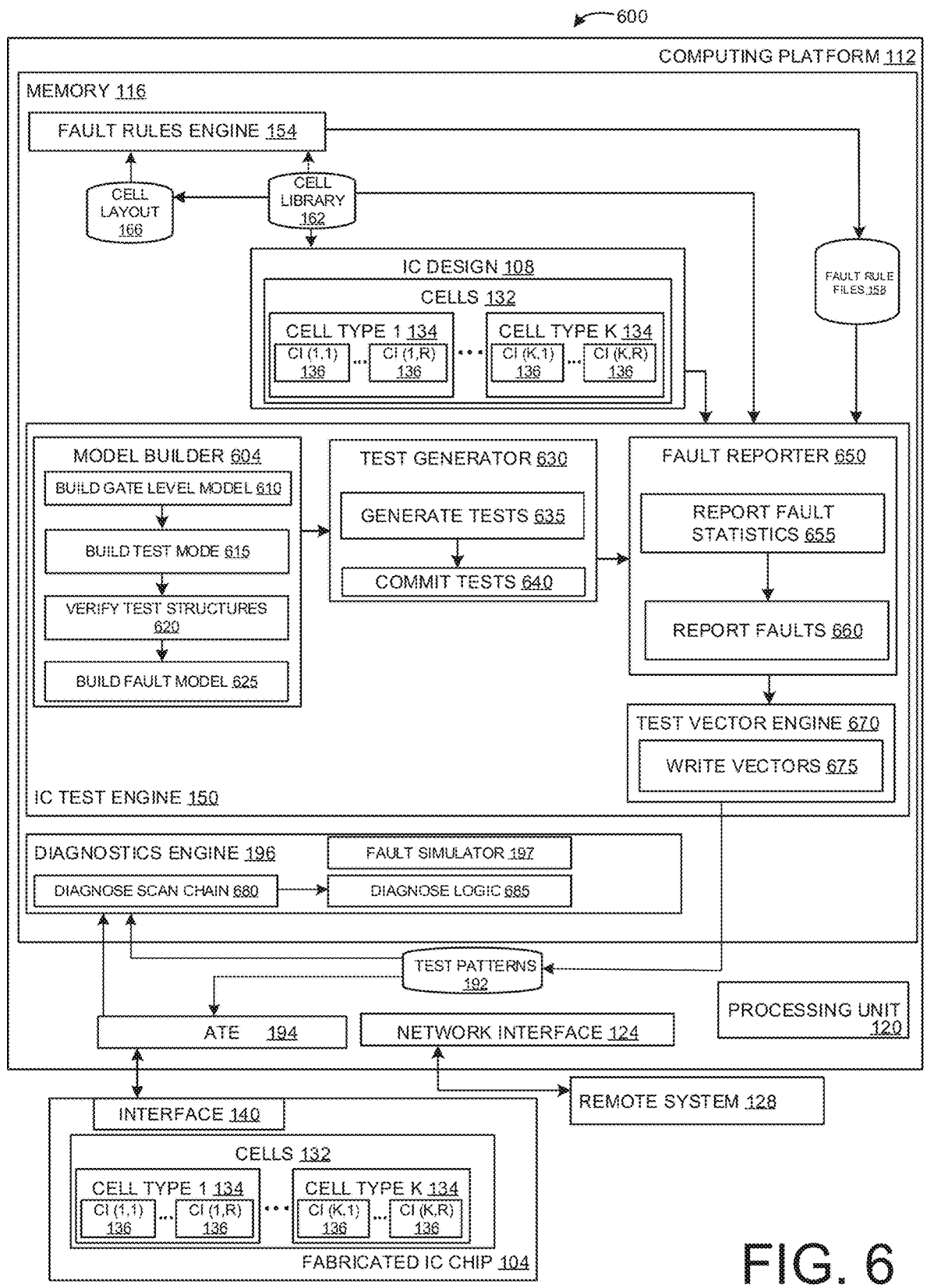
FIG. 6 illustrates another example of a system for diagnosing faults and/or defects in a fabricated IC chip that is based on an IC design.

FIG. 6 illustrates a system 600 for diagnosing measured faults in the fabricated IC chip 104. The system 600 is similar to the system 100 of FIG. 1 with a detailed view and description of the IC test engine 150 and the diagnostics engine 196. Thus, for purposes of simplification of explanation, the same reference numbers are employed in FIGS. 1 and 6 to denote the same structure. Additionally, some reference numbers are not re-introduced. The IC design 108 can be stored in the memory 116 of the computing platform 112. The IC design 108 can be implemented, for example, as design specifications for an IC chip. The fabricated IC chip 104 represents a physical instantiation of the IC design 108, and the interface 140 can provide an interface for external systems to provide stimuli to the components of the fabricated IC chip, including the cells 132 of the fabricated IC chip 104.

The IC test engine 150 stored in the memory 116 is configured to employ ATPG techniques to generate the test patterns 192 that include N-cycle (where N is greater than or equal to two) at-speed test patterns that are configured to test for transition faults/defects in the fabricated IC chip 104 to ensure proper operation. More particularly, the IC test engine 150 generates the test patterns 192 that are employable by the ATE 194 to test the fabricated IC chip 104. The ATE 194 is configured to apply the test patterns 192 to the fabricated IC chip 104 and record the results in test result data. The test result data and the test patterns 192 can be sent to the diagnostics engine 196 to diagnose the cause of one or more failures of test patterns recorded in the test result data in the fabricated IC chip 104.

The IC test engine 150 can also operate in concert with the fault rules engine 154 stored in the memory 116. The fault rules engine 154 can be configured/programmed to generate fault rules files 158. In some examples, the fault rules engine 154 generates DDMs that each represent a user-readable format of a corresponding fault rules file 158. Each fault rules file 158 represents a set of fault rules for a particular cell type 134 that corresponds to a cell that is selected from a cell library 162. The cell library 162 can include, but is not limited to, data characterizing a physical layout of each of the K number of cell types 134 in the cells 132 of the IC design 108 and the fabricated IC chip 104. The cell library 162 can also include structural Verilog (.v), behavioral Verilog (.v) and timing models (.lib).

To generate the fault rules files 158, the fault rules engine 154 can read a cell layout 166 from the cell library 162. The cell layout 166 can characterize a physical layout for a particular cell type 134 extracted from the cell library 162. The fault rules engine 154 generates a particular fault rules file 158 of the fault rules files 158 based on the cell identified in the cell layout 166. Each fault rules file 158 can provide information similar to the information included in the DDM 300 of FIG. 3A and/or the DDM 350 of FIG. 3B described with respect to the given example. The fault rules files 158 for each of the K number of cell types 134 of the cells 132 included in the IC design 108 are provided to the IC test engine 150 for the generation of the test patterns 192 for the fabricated IC chip 104 using ATPG techniques.

The IC test engine 150 can represent a plurality of software modules operating in an ordered sequence to generate the test patterns 192 using ATPG techniques. The IC test engine 150 includes a model builder 604 that can build a model of the IC design 108 that is employable to generate test patterns to test the fabricated IC chip 104. To build the model of the IC design 108, the model builder 604 can execute model builder operations. More particularly, at 610, the model builder 604 builds a gate level model of the IC design 108. At 615, the model builder 604 builds a test mode. The build test mode reads test pin specifications and creates a test mode view given these test pin specifications. Such test pin specifications, among other things, can include scan-input pin names, scan-output pin names, test clock pin names, set/reset pin names and other constraints necessary to put the design in a test mode.

At 620, the model builder 604 verifies the presence of test structures in the gate level model of the IC design 108. The test structures represent scan and test circuitry present in the IC design 108 to facilitate the application of cell-aware test patterns to the fabricated IC chip 104. The operations at 620 also check if the IC design 108 complies with test design rules given the test constraints/specifications read in 615. For example, the operations at 620 can verify that the flops in the IC design 108 can be controlled by specified test clocks, and can verify that these test clocks can be controlled properly through primary input pins. Additionally, the operations at 620 can verify that set/reset to flops can be controlled through primary input pins and/or that the flops are in an off state.

At 625, the model builder 604 can employ the gate level design and the fault rules files 158 to build a fault model for the IC design 108. The fault model includes candidate faults/defects represented as cell-aware transition faults/defects and/or other faults/defects such as cell-aware defects. The fault model built by the model builder 604 can be provided to a test generator 630 of the IC test engine 150.

The test generator 630 can execute test generation operations for multicycle test patterns, including N-cycle at-speed test patterns. More particularly, at 635, the test generator 630 can employ ATPG techniques to generate N-cycle at-speed test patterns, such as boundary model test patterns and cell-aware test patterns for the fabricated IC chip 104 based on the fault model generated by the model builder 604. More specifically, the IC test engine 150 can generate a set of N-cycle at-speed test patterns tailored for each of the R number of cell instances 136 of each of the K number of cell types 134 of the cells 132 in the IC design 108. The test patterns are generated based on candidate transition faults/defects of cells 132 of the IC design 108. At 640 the test generator 630 commits the test patterns generated at 635 to test the fabricated IC chip 104. The test patterns generated by the test generator 630 can be provided to a fault reporter 650.

The fault reporter 650 can execute operations related to fault reporting. More particularly, at 655, the fault reporter 650 can generate report fault statistics that characterize, for example data related to the test patterns applied to the fabricated IC chip 104. Additionally, at 660, the fault reporter 650 can generate fault reports for the fault statistics and cell defect statistics.

A test vector engine 670 of the IC test engine 150 can convert the ATPG test patterns into a format consumable by the ATE 194. In particular, at 675, the test vector engine 670 can write vectors that implement the test patterns 192 that are employable by the ATE 194. The test patterns 192 can be stored, for example, on the memory 116 and/or at the ATE 194.

The ATE 194 stimulates inputs of the fabricated IC chip 104 as dictated by the test patterns 192 and the ATE 194 is configured to compare a measured output of the fabricated IC chip 104 with expected values stored in the test patterns 192. The results of the tests are stored as test result data. At a subsequent time, this test result data can be provided to the diagnostics engine 196.

The diagnostics engine 196 can receive the test patterns 192 and the test result data from the ATE 194. Additionally, in some examples, the diagnostics engine 196 can receive a copy of the fault rules files 158 provided from the fault rules engine 154. The diagnostics engine 196 can employ the test patterns 192 and the test result data to determine a cause of one or more failures in the fabricated IC chip 104. The test result data can include miscompare values for particular test patterns 192, wherein a value measured by the ATE 194 differed from an expected value.

The diagnostics engine 196 can categorize the measures during test patterns 192 that result in these miscompare values (unexpected values) as tester failed (TF), and measures during test patterns 192 that result in expected values measured by the ATE 194 as tester passed (TP). Furthermore, at 680, the diagnostics engine 196 can employ a fault simulator 197 to diagnose the measured values in a scan chain in the IC design 108.

At 685, the diagnostics engine 196 can employ the fault simulator to diagnose logic in the IC design 108 and fault-simulate candidate transition faults/defects to determine a list of transition faults/defects that would cause the IC design 108 to fail in presence of the given transition fault/defect on the ATE 194, while applying a given N-cycle at-speed test pattern. The measures during diagnostics fault simulation of candidate faults/defects that observe the fault effect are categorized as simulation failed (SF) for a given test pattern and fault/defect. The measures during diagnostics fault simulation that do not observe the fault effect are categorized as simulation passed (SP) for the given test pattern and fault/defect. Additionally, at 685, the diagnostics engine 196 can combine the test result data recorded by the ATE 194 with the results of the fault-simulation and categorize each such result into one of four categories, TFSF, TSFP, TPSF and TPSP. These categories are employable to score each execution of the test patterns 192 for different possible candidate faults/defects. The categories of TFSF and TPSP are positive scores (increasing the probability for the corresponding candidate fault/defect) and TFSP and TPSF are negative scores (decreasing the probability for the corresponding candidate fault/defect). Stated differently, the categories of TFSF and TPSP show consistency between measured results of application of the test patterns 192 to the fabricated IC chip 104 and the simulation of the application of the test patterns 192, thereby increasing the probability that a corresponding candidate fault/defect is actually present in the fabricated IC chip 104. Conversely, the categories of TFSP and TPSF show an inconsistency between the measured results of application of the test patterns 192 to the fabricated IC chip 104 and the simulation of the application of the test patterns 192, thereby decreasing the probability that a corresponding candidate fault/defect is present in the fabricated IC chip 104. Accordingly, for each test pattern 192 that has been categorized as tester failed (TF), the diagnostics engine can determine a most likely cause, namely a most likely (greatest probability) fault/defect present in the fabricated IC chip 104.

The diagnostics engine 196 can generate a diagnostics report summarizing the most likely faults/defects (if any) that are present in the fabricated IC chip 104. Furthermore, in some situations the diagnostic report generated by the diagnostics engine is employable to determine whether a manufacturing process or the IC design 108 is causing a fault/defect or if the fault/defect is an anomaly.

By employing the diagnostics engine 196, in examples where the test patterns 192 generated by the IC test engine 150 include N-cycle (where N is greater than or equal to two) at-speed test patterns testing for transition faults/defects, the results of application of the test patterns 192 can be parsed, and employed to test for transition faults/defects that require N+P cycle at-speed test patterns (where P is a positive integer), as well as testing for transition faults/defects that were not originally targeted by the test patterns 192. In particular, as demonstrated, the diagnostics engine 196 can fault-simulate and sim-shift such N-cycle at-speed test patterns to leverage previously ignored information present in the test result data generated by the ATE 194. Such sim-shifting can improve the accuracy in predicting a cause of faults in the fabricated IC chip 104 without requiring additional test patterns to be executed separately.

Figure 7:
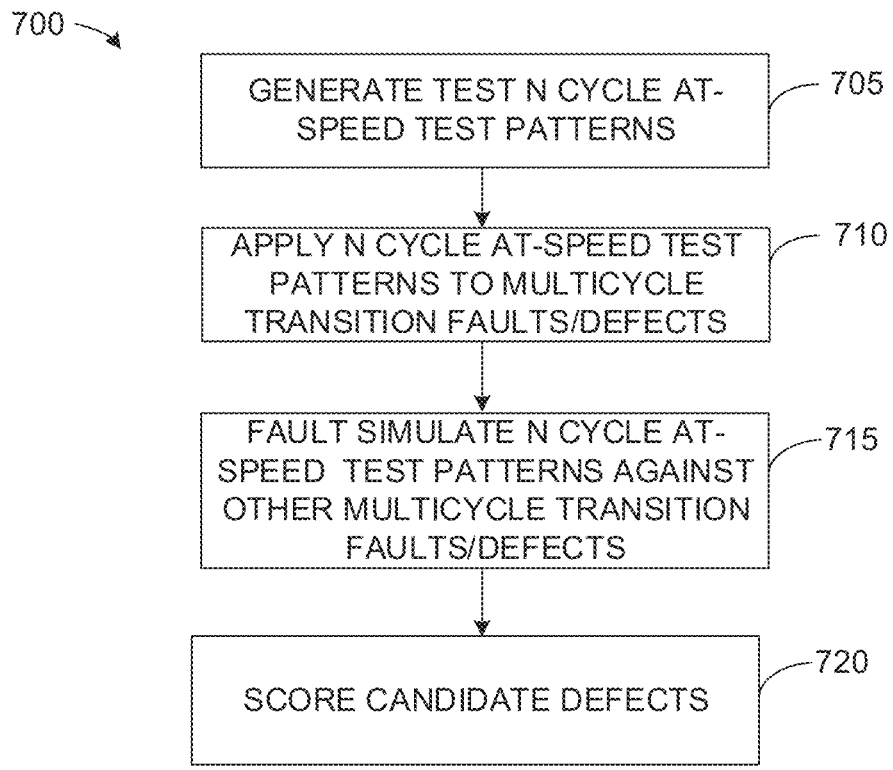
FIG. 7 illustrates a flowchart of an example method for diagnosing faults and/or defects in a fabricated IC chip.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 700 for diagnosing faults/defects in a fabricated IC chip. The method 700 can be implemented by the system 100 of FIG. 1 and/or the system 600 of FIG. 6. At 705, an IC test engine (e.g. the IC test engine 150 of FIG. 1) generates N-cycle at-speed test patterns for testing for candidate faults/defects of a first set of transition faults/defects of an IC design (where N is an integer greater than or equal to two). The first set of transition faults/defects can be boundary model or cell-aware transition faults/defects that are detectable with a given N-cycle at-speed test pattern that has one fault initialization cycle operating at a test frequency and N-cycles operating at a functional frequency. At 710, an ATE (e.g., the ATE 194 of FIG. 1) applies the plurality of N-cycle at-speed test patterns to a fabricated IC chip that is based on the IC design and provides test result data characterizing application of the N-cycle at-speed test patterns to the fabricated IC chip.

At 715, a diagnostics engine (e.g., the diagnostics engine 196 of FIG. 1) selectively fault-simulates a subset of the N-cycle at-speed test patterns against other multicycle transition faults/defects to diagnose a second set of transition faults/defects in the fabricated IC chip. The second set of transition faults/defects can be, for example, cell-aware transition faults/defects, including transition cell-aware faults/defects that conventionally require N+P cycle at-speed test patterns (where P is a positive integer).

At 720, the diagnostics engine can score candidate transition faults/defects (e.g. TPSP, TFSP, TPSF or TFSP) in the first set of transition faults/defects and the second set of transition faults/defects or each applicable test pattern of the subset of the N-cycle at-speed test patterns to determine a most likely transition fault/defect present in the fabricated IC chip. Stated differently, at 720, the diagnostics engine scores the candidate faults/defects, which includes multi-cycle transition faults/defects applicable to the subset of the N-cycle at-speed test patterns to determine the most likely fault/defect(s) present in the fabricated IC chip. Thus, the method 700 enables the diagnosis of transition faults/defects, such as multi-cycle transition cell-aware defects, that are conventionally only detectable with an N+P at-speed test pattern without the need to separately execute such N+P cycle at-speed test patterns.

Figure 8:
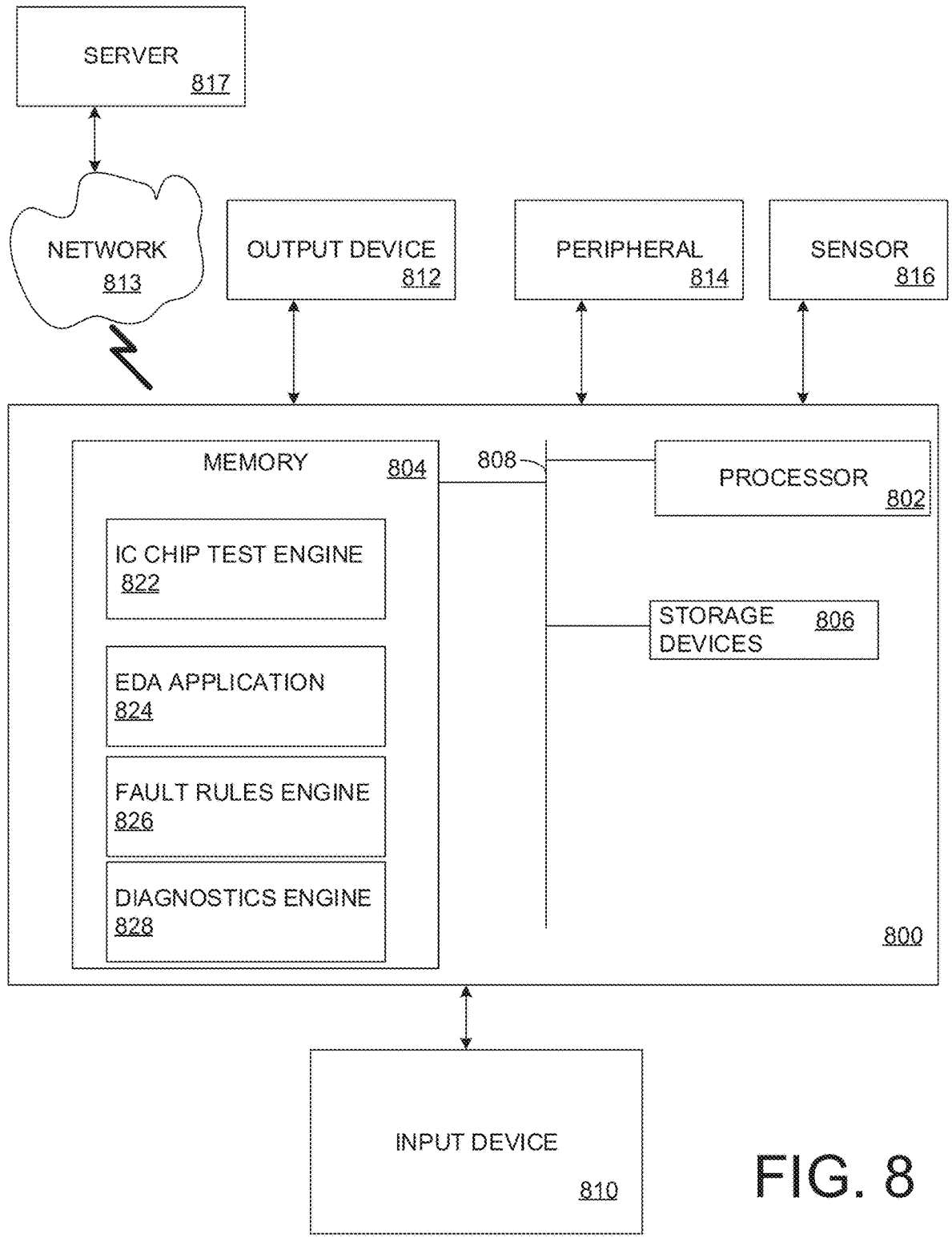
FIG. 8 illustrates an example of a computing system employable to execute an IC test engine and a fault rules engine.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 8, the computing system 800 can include a computer processor 802, associated memory 804 (e.g., RAM), cache memory, flash memory, etc.), one or more storage devices 806 (e.g., a solid state drive, a hard disk drive, an optical drive such as a compact disk (CD) drive or digital versatile disk (DVD) drive, a flash memory stick, etc.) and numerous other elements and functionalities. The computer processor 802 may be an IC chip for processing instructions. For example, the computer processor may be one or more cores, or micro-cores of a processor. Components of the computing system 800 can communicate over a data bus 808.

The computing system 800 may also include an input device 810, such as any combination of one or more of a touchscreen, keyboard, mouse, microphone, touchpad, electronic pen, or any other input device. Further, the computing system 800 can include an output device 812, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 812 can be the same physical device as the input device 810. In other examples, the output device 812 and the input device 810 can be implemented as separate physical devices. The computing system 800 can be connected to a network 813 (e.g., LAN, a wide area network (WAN) such as the Internet, a mobile network, or any other type of network) via a network interface connection (not shown). The input device 810 and output device(s) 812 can be connected locally and/or remotely (e.g., via the network 813) to the computer processor 802, the memory 804 and/or the storage devices 806. Many different types of computing systems exist, and the aforementioned input device 810 and the output device 812 can take other forms. The computing system 800 can further include a peripheral 814 and a sensor 816 for interacting with the environment of the computing system 800 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 800 can communicate with a server 817 via the network 813.

The memory 804 can include an IC test engine 822 to test an IC design that is instantiated as a fabricated IC chip. The IC design can be generated, for example, by an EDA application 824. The memory 804 can also include a fault rules engine 826 for generating fault rules files and/or DDMs to facilitate the testing of the fabricated IC chip. The memory further includes a diagnostics engine 828 for analyzing test result data and test patterns generated by the IC test engine 822 to diagnose a cause of failures in the fabricated IC chip.

Further, one or more elements of the aforementioned computing system 800 can be located at a remote location and connected to the other elements over the network 813. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-readable instructions, the machine-readable instructions comprising:
   an integrated circuit (IC) test engine that generates N-cycle at-speed test patterns for testing for candidate faults and/or defects of a first set of transition faults and/or defects of an IC design, where N is an integer greater than or equal to two; and
   a diagnostics engine that:
      receives test result data characterizing application of the N-cycle at-speed test patterns to a fabricated IC chip based on the IC design by automatic test equipment (ATE), in which the test result data includes a set of miscompare values characterizing a difference between an expected result and a result measured by the ATE for a given N-cycle at-speed test pattern of the N-cycle at-speed test patterns;
      employs a fault simulator to:
         fault-simulate the N-cycle at-speed test patterns against a fault model that includes a first set of transition faults and/or defects; and
         fault-simulate a subset of the N-cycle at-speed test patterns against a fault model that includes multicycle transition faults and/or defects utilizing sim-shifting to diagnose a second set of transition faults and/or defects in the fabricated IC chip that are only detectable with test patterns that have one or more additional initialization cycles than a corresponding one of the N-cycle at-speed test patterns; and scores candidate fault and/or defects in the first set of transition faults and/or defects and the second set of transition faults and/or defects for applicable test patterns of the N-cycle at-speed test patterns to determine a most likely fault and/or defect present in the fabricated IC chip.

2. The medium of claim 1, wherein the sim-shifting of the subset of the N-cycle at-speed test patterns comprises:

fault-simulating a scan-in shift interval of a respective N-cycle at-speed test pattern of the subset of the N-cycle at-speed test patterns to identify a set of values prior to a fault initialization cycle of the respective N-cycle at-speed test pattern; and employing the set of values prior to the fault initialization cycle during the scan-in shift interval of the respective N-cycle at-speed test pattern as extra fault initialization cycles for a corresponding N+P cycle at-speed test pattern, where P is a positive integer to diagnose a respective transition fault and/or defect of the second set of transition faults and/or defects.

3. The medium of claim 2, wherein the scoring comprises comparing the test result data and fault simulation results for the faults and/or defects in a combination of the first set and the second set of transition faults and/or defects to determine an order of probability that the set of miscompare values of the test result data for the given N-cycle at-speed test pattern are caused by a given transition fault and/or defect and other transition faults and/or defects.

4. The medium of claim 3, wherein each candidate fault and/or defect in the second set of transition faults and/or defects is a multicycle transition cell-aware candidate defect.

5. The medium of claim 4, wherein each candidate fault and/or defect in the first set of transition faults and/or defects is a multicycle transition fault and/or defect.

6. The medium of claim 3, wherein the test result data and fault simulation results for a given fault/defect are aggregated across one or more measures in a given N-cycle at-speed test pattern.

7. The medium of claim 6, wherein the diagnostics engine determines that a probability of the set of miscompare values being caused by the transition fault and/or defect of the second set of transition faults and/or defects is greater than the probability of the set of miscompare values being caused by a transition fault and/or defect of the first set of transition faults and/or defects.

8. The medium of claim 6, wherein the probability associated with a presence of a fault/defect on a fabricated IC chip is based on an aggregation of comparisons between the fault simulation results and the test result data for two or more N-cycle at-speed test patterns.

9. The medium of claim 8, wherein the comparison aggregates the fault simulation results and the test result data for two or more faults and/or defects from the subset of the N-cycle at-speed test patterns.

10. The medium of claim 6, wherein the probability for a particular candidate fault and/or defect is increased or decreased based on a respective consistency or inconsistency between the test result data and fault-simulation of the particular candidate fault and/or defect.

11. A system comprising:

automatic test equipment (ATE) that applies N-cycle at-speed test patterns to a fabricated integrated circuit (IC) chip that is based on an IC design and provides test result data characterizing application of the N-cycle at-speed test patterns to the fabricated IC chip, where N is an integer greater than or equal to two, in which the test result data includes a set of miscompare values characterizing a difference between an expected result and a result measured by the ATE for a given N-cycle at-speed test pattern of the N-cycle at-speed test patterns;

a non-transitory memory that stores machine-readable instructions; and a processing unit that accesses the memory and executes the machine-readable instructions, the machine-readable instructions comprising:

an IC test engine that generates the N-cycle at-speed test patterns for testing for candidate faults and/or defects of a first set of transition faults and/or defects of the IC design; and a diagnostics engine that:

employs a fault simulator to fault-simulate a subset of the N-cycle at-speed test patterns against a fault model that includes multicycle transition faults and/or defects utilizing sim-shifting to diagnose a second set of transition faults and/or defects in the fabricated IC chip that are only detectable with a multicycle test pattern having one or more additional initialization cycles than a corresponding one of the N-cycle at-speed test patterns; and scores candidate faults and/or defects in the first set of transition faults and/or defects and the second set of transition faults and/or defects for applicable test patterns of the subset of the N-cycle at-speed test patterns to determine a most likely fault and/or defect present in the fabricated IC chip.

12. The system of claim 11, wherein the sim-shifting of the subset of the N-cycle at-speed test patterns comprises:

fault-simulating a scan-in shift interval of a respective N-cycle at-speed test pattern of the subset of the N-cycle at-speed test patterns to identify a set of values prior to a fault initialization cycle of the respective N-cycle at-speed test pattern; and employing the set of values prior to the fault initialization cycle during the scan-in shift interval of the respective N-cycle at-speed test pattern as extra fault initialization cycles for a corresponding N+P cycle at-speed test pattern, where P is a positive integer to diagnose a respective transition fault and/or defect of the second set of transition faults and/or defects.

13. The system of claim 12, wherein the scoring comprises comparing the test result data and fault simulation results for the transition faults and/or defects in a combination of the first set and second set of transition faults and/or defects to determine an order of probability that the set of miscompare values of the test results for the given N-cycle at-speed test pattern are caused by a given transition fault and/or defect and other transition faults and/or defects.

14. The system of claim 13, wherein the probability associated with the set of miscompare values is based on a comparison of the test result data and fault simulation results for a set of faults and/or defects against the given test pattern of the subset of the N-cycle at-speed test patterns.

15. The system of claim 13, wherein the diagnostics engine determines that probability of the set of miscompare values being caused by a transition fault and/or defect of the second set of transition faults and/or defects is greater than the probability of the set of miscompare values being caused by a transition fault and/or defect of the first set of transition faults and/or defects.

16. The system of claim 15, wherein the transition fault and/or defect of the second set of transition faults and/or defects is an open wire defect in the fabricated IC chip.

17. The system of claim 13, wherein the comparing aggregates the fault simulation results and the test result data for two or more measures from a given N-cycle at-speed test pattern of the subset of the N-cycle at-speed test patterns.

18. A method for diagnosing faults and/or defects in a fabricated integrated circuit (IC) chip, the method comprising:
- generating, by an IC test engine operating on a computing platform, N-cycle at-speed test patterns for testing for candidate faults and/or defects of a first set of transition faults and/or defects of an IC design, where N is an integer greater than or equal to two;
- applying, by automatic test equipment (ATE) the N-cycle at-speed test patterns to a fabricated IC chip that is based on the IC design and provides test result data characterizing application of the N-cycle at-speed test patterns to the fabricated IC chip, in which the test result data includes a set of miscompare values characterizing a difference between an expected result and a result measured by the ATE for a given N-cycle at-speed test pattern of the N-cycle at-speed test patterns;
- selectively fault-simulating, by a fault simulator of a diagnostics engine operating on the computing platform, a subset of the N-cycle at-speed test patterns against a fault model that includes multicycle transition faults and/or defects utilizing sim-shifting to diagnose a second set of transition faults and/or defects in the fabricated IC chip that are only detectable with multicycle test patterns having one or more additional initialization cycles than a corresponding one of the N-cycle at-speed test patterns; and
- scoring, by the diagnostics engine candidate, faults and/or defects in the first set of transition faults and/or defects and the second set of transition faults and/or defects for applicable test patterns of the subset of the N-cycle at-speed test patterns to determine a most likely fault and/or defect present in the fabricated IC chip.

19. The method of claim 18, wherein the sim-shifting of the subset of the N-cycle at-speed test patterns comprises:
- fault-simulating a scan-in shift interval of a respective N-cycle at-speed test pattern of the subset of the N-cycle at-speed test patterns to identify a set of values prior to a fault initialization cycle of the respective N-cycle at-speed test pattern; and
- employing the set of values prior to the fault initialization cycle during the scan-in shift interval of the respective N-cycle at-speed test pattern as extra fault initialization cycles for a corresponding N+P cycle at-speed test pattern, where P is a positive integer to diagnose a respective transition fault and/or defect of the second set of transition faults and/or defects.

20. The method of claim 18, wherein the scoring comprises comparing the test result data and fault simulation results for the faults and/or defects in a combination of the first set and the second set of transition faults and/or defects to determine an order of probability that the set of miscompare values of the test results for the given N-cycle at-speed test pattern are caused by a given transition fault and/or defect and other transition faults and/or defects.

* * * * *